US008447423B2

(12) United States Patent
Budiman et al.

(10) Patent No.: US 8,447,423 B2
(45) Date of Patent: May 21, 2013

(54) METHOD AND APPARATUS FOR OPTIMIZING A PERFORMANCE INDEX OF A BULK PRODUCT BLENDING AND PACKAGING PLANT

(75) Inventors: Benny S. Budiman, Chantilly, VA (US); Chris P. Kramer, Manassas, VA (US); Laura L. Locke, Philadelphia, PA (US); Marcel R. Mueller, Arlington, VA (US); Sangbum Lee, Centreville, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 318 days.

(21) Appl. No.: 12/950,364

(22) Filed: Nov. 19, 2010

(65) Prior Publication Data

US 2011/0130857 A1   Jun. 2, 2011

Related U.S. Application Data

(60) Provisional application No. 61/272,982, filed on Nov. 30, 2009.

(51) Int. Cl.
*G06F 19/00* (2006.01)

(52) U.S. Cl.
USPC ............ 700/104; 700/100; 700/103; 700/106

(58) Field of Classification Search
USPC ............ 700/97, 99, 100, 102, 103, 104, 106; 705/7.12, 7.13, 7.25, 7.26, 28
See application file for complete search history.

(56) References Cited

U.S. PATENT DOCUMENTS

| | | | |
|---|---|---|---|
| 4,827,423 | A | 5/1989 | Beasley et al. |
| 5,311,438 | A | 5/1994 | Sellers et al. |
| 6,898,472 | B2 | 5/2005 | Crampton et al. |
| 7,200,518 | B1 | 4/2007 | Smith |
| 2003/0115090 | A1 | 6/2003 | Mujtaba et al. |
| 2005/0086094 | A1 | 4/2005 | Trautmann et al. |
| 2005/0119768 | A1 | 6/2005 | Retsina |
| 2008/0086364 | A1 | 4/2008 | Hahn et al. |
| 2008/0294484 | A1* | 11/2008 | Furman et al. ............... 705/8 |
| 2009/0192864 | A1* | 7/2009 | Song et al. .................. 705/28 |

OTHER PUBLICATIONS

Kallrath, "Mixed integer optimization in the chemical process industry, experience, potential, and future perspectives" Trans IChemE, vol. 78, Part A, Sep. 200, pp. 809-822.*
Kallrath, "Planning and scheduling in the process industry", OR Spectrum, Aug. 2002, vol. 24, No. 3, pp. 219-250.*
PCT/US2010/57578, PCT International Search Report, Form PCT/ISA/210, dated Feb. 2, 2011.
PCT/US2010/57578, PCT Written Opinion of the International Searching Authority, Form PCT/ISA/237, dated Feb. 2, 2011.

(Continued)

*Primary Examiner* — Kavita Padmanabhan
*Assistant Examiner* — Steven Garland
(74) *Attorney, Agent, or Firm* — Glenn T. Barrett

(57) ABSTRACT

A method of generating capacity, production and inventory plans, over a designated planning horizon, which will optimize, with respect to a designated performance index, the operations of one or more bulk product blending and packaging plants and a specified number, ranging from zero to a certain count, of distribution centers while meeting key operating constraints. Also decision making tools and computer implemented programs for performing the method.

42 Claims, 5 Drawing Sheets

OTHER PUBLICATIONS

Adonyi, Robert, et al. "Effective Scheduling of a Large-Scale Paint Production System", Journal of Clearner Production No. 16 (2008), pp. 225-232.

Bjorkqvist, Jerker, "Discrete and Disjunctive Optimization: Parallel Strategies and Applications in Industrial Scheduling", Process Design Laboratory, Department of Chemical Engineering Abo Akademi University, Abo 2001, pp. 1-42.

Lasschuit, Winston, et al., "Supporting Supply Chain Planning and Scheduling Decisions in the Oil and Chemical Industry", Computers and Chemical Engineering No. 28 (2004), pp. 863-870.

* cited by examiner

METHOD AND APPARATUS FOR OPTIMIZING A PERFORMANCE INDEX OF A BULK PRODUCT BLENDING AND PACKAGING PLANT

CROSS-REFERENCES

This application claims the benefit of U.S. Provisional Application No. 61/272,982 filed on 30 Nov. 2009.

BACKGROUND OF THE INVENTION

1. Technical Field

The field of the invention is optimization methods, tools and programs.

2. Description of Related Art

Bulk product blending and packaging plants are known in the art. Illustrative bulk products made in such plants are oil products (e.g., lube oil, waxes and greases), surface coatings (e.g., primers, paints, stains and varnishes), health & personal care products (e.g., liquid laundry detergent, dishwashing liquid, shampoo and conditioner, liquid soap, and body wash), and food & beverage products (e.g., alcoholic drinks, soft drinks, bottled water, and condiments). These plants make a multitude of product grades and sizes.

Ensuring capacity, production and inventory to meet the uncertain level of demand for a multitude of product grades and sizes presents a challenging problem. One solution has been to simply maintain excess levels of inventory and/or reserve spare manufacturing capacity sufficient to meet any unanticipated spike in demand for a given product. However, this approach is costly.

Present practice separates long and medium term capacity planning from the production and inventory planning in a hierarchical manner. In other words, capacity decisions are made first and then become constraints in the later planning of production and inventory.

More particularly, capacity planning is often done every two or three years for a mid to long range horizon of up to a few years. Capacity planning is also typically split into a two-step process consisting of long range capacity planning and medium range capacity planning. For example, long-range capacity planning may involve strategic resource decisions such as plant expansion or contraction, new plant openings or closings, etc., based on predicted demand forecasts and/or the company's long term business strategy. In turn, medium-range capacity planning may involve adding or removing shifts (often accompanied by an addition or reduction in workforce), adding equipment, adding or removing workers in a given work shift, permitting or requiring overtime work, etc. These medium-range planning decisions are typically made after the long term decisions on aggregate capacity (a.k.a. maximum production rate) have already been made.

In contrast, production and inventory planning is typically done biannually or quarterly to make shorter term decisions on the required levels of production and safety stock in view of predicted demand while keeping aggregate capacity—typically expressed in terms of volume per unit time—constant. For example, within a given plant configuration and a specified operating schedule, production batch size can be optimized to meet the demand requirements at the lowest manufacturing cost. Since each batch production may incur changeover costs, production of larger batch sizes can allow for reduced costs by reducing the number of changeovers needed. However, larger batch sizes tend to increase the wait time needed for other batches to be processed, thus requiring increased levels of safety stock to meet demand. This increases inventory holding costs. Thus, the operation of a bulk product blending and packaging plant can be improved by finding an optimum batch quantity that balances these competing costs.

Currently, because production and inventory planning are done hierarchically separate from capacity planning, the resultant operational plan may fail to realize certain opportunities to reduce cost and/or capture increased demand. An operational plan conceived in this manner might fail to capture an opportunity to reduce cost by carrying less safety inventory immediately following an increase in capacity before arrival of the anticipated increase in demand. Conversely, an operational plan conceived in this manner might fail to capture an increase in demand by carrying more safety inventory before capacity is increased after a sustained increase in demand. Hierarchical planning will not always yield the most optimum planning of production and inventory.

The current state of the art includes the Rough Cut Capacity (RCCP) and Capacity Requirement Planning (CRP) steps implemented in most Enterprise Resource Planning (ERP) software packages. Both the RCCP and CRP techniques can be used to verify whether sufficient capacity exists to meet the requirements of a proposed master production plan and to provide an aggregate capacity recommendation for meeting the plan. However, a tool to recommend the appropriate amount of capacity expressed in terms of equipment, operating shift structure and workforce is not available.

Thus, there is a need for more integrated decision-making methods, tools and computer programs to improve the operation of bulk product blending and packaging plants.

BRIEF DESCRIPTION OF THE SEVERAL VIEWS OF THE DRAWINGS

The drawings are for illustration purposes only. The drawings are not intended to limit the scope of the present inventions in any way.

SUMMARY OF THE INVENTION

Figure 1:
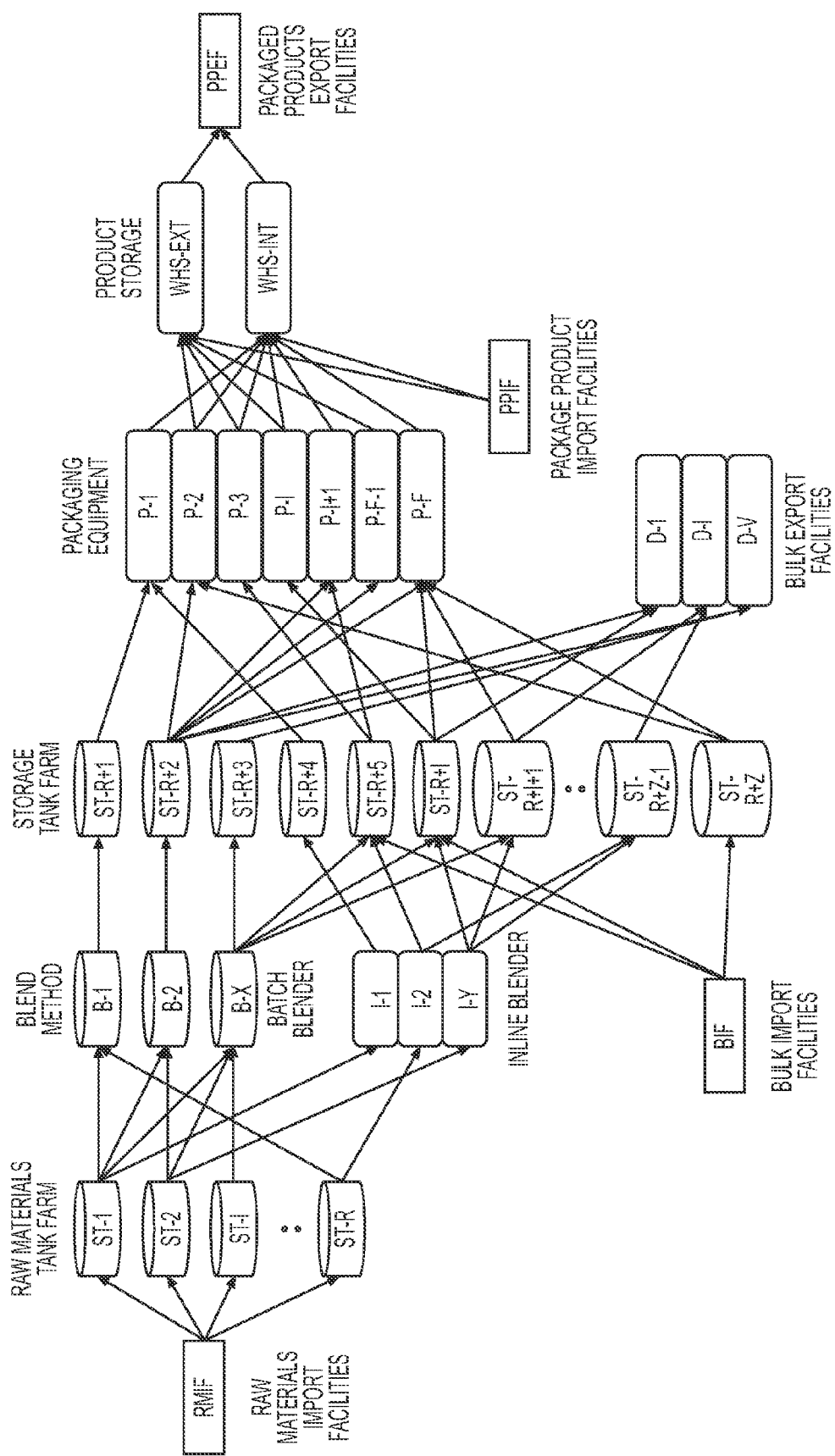
FIG. 1 shows an example of a plant that can be modeled by the invention.

The invention pertains to decision making methods, tools and computer programs to generate capacity, production and inventory plans, for a given planning horizon comprising one or more time interval(s), to improve or optimize, with respect to a given performance index, the operations of one or more bulk product blending and packaging plants while still meeting key operating constraints. In each case, the one or more plant(s) comprise a network of equipment including blending equipment, one or more storage tanks, packaging equipment, one or more packaged product storage facilities and unloading and discharging facilities.

One embodiment of the invention is a method for operating one or more bulk product blending and packaging plant(s) in a manner that moves operations toward an optimum for a performance metric, during a designated time horizon, under designated constraints. Another embodiment of the invention is to optimize the performance of one or more bulk product blending and packaging plant(s) in isolation such that a performance metric of each plant is optimized independently from that of another. Another embodiment of the invention is a method for optimizing two or more blending and packaging plant(s) simultaneously in a way that allows capturing of capacity, production, and inventory cooperation benefits between plants. Another embodiment of the invention is a method for operating a supply network comprising one or more bulk product blending and packaging plant(s) and one or more distribution center(s) in a manner that moves operations of the supply network toward an optimum for a performance metric, during a designated time horizon, under designated constraints. The method comprises at least four steps.

The first step in the method is a computer implemented step of receiving a data set. The data set includes one or more of the following for each blending and packaging plant: (a) data identifying a time horizon; (b) data identifying blending equipment and one or more operational parameters thereof; (c) data identifying storage tanks and one or more operational parameters thereof; (d) data identifying packaging equipment and one or more operational parameters thereof; (e) data identifying packaged product storage facilities and one or more operational parameters thereof; (f) data identifying unloading and discharging facilities and one or more operational parameters thereof; (g) data relating to the interconnections between plant equipment; and (h) data relating to the historical demand for each packaged product. In an embodiment that simultaneously drives operations at two or more plants toward an optimum, additional required datasets comprise datasets defining the ability, benefits and/or detriments of transporting blended and/or packaged products between plants. In an embodiment that includes one or more distribution center(s), additional required datasets comprise (a) a dataset identifying the distribution center(s) and one or more operational parameters thereof; (b) a dataset defining the ability, benefits, and/or detriments of transporting blended products between plants; (c) a dataset defining the ability, benefits, and/or detriments of transporting packaged products from each plant to each distribution center; and (d) a dataset defining the ability, benefits, and/or detriments of transporting packaged products between applicable distribution centers.

The second step in the method is a computer implemented step of using the data set to populate model parameters in a mixed-integer non-linear mathematical optimization model constructed to mathematically describe the operations of the blending and packaging plant(s). In an embodiment that includes one or more distribution center(s), the mathematical optimization model describes the operations of the blending and packaging plant(s) and the distribution center(s). The model, in addition to parameters, also comprises decision variables, constraints, and an objective function. The model's variables represent quantitative decisions to be made in each interval regarding plant capacity, production and inventory. The model's constraints include one or more of the following: (a) one or more terms limiting the availability and capacity of the blending equipment; (b) one or more terms limiting the availability and capacity of the storage tanks; (c) one or more terms limiting the availability and capacity of the packaging equipment; (d) one or more terms limiting the availability and capacity of the packaged product storage facilities; (e) one or more terms limiting the availability and capacity of the unloading and discharging facilities; (f) one or more non-linear terms relating the number of batches of each packaged product to product batch size; and (g) one or more non-linear terms relating the size of each batch of packaged products to the quantity of safety stock required for the product. An additional set of constraints to include in an embodiment that optimizes a supply network of one or more plant(s) and one or more distribution center(s) involves one or more terms limiting the availability and capacity of the distribution center(s). The model's objective function is a performance metric.

In one embodiment, the mixed-integer non-linear mathematical optimization model is in the form of a mixed-integer non-linear program (MINLP).

In another embodiment, the mixed-integer non-linear mathematical optimization model is in the form of a mixed-integer non-linear dynamic program.

In other embodiments involving multi-plant optimization and optimization of a supply network, each plant and each applicable distribution center can be represented, by using the agent based model (ABM), as an intelligent agent incorporating rules and/or algorithms that govern how decisions are made (values of decision variables are determined). The decision variables in each agent comprise decision variables involving plant capacity, production, and inventory for each plant and those involving distribution center capacity and inventory for each distribution center. In this embodiment, additional rules and/or algorithms governing the interactions between agents are specified in terms of decision variables between two agents. Examples of these decision variables include, but are not limited to, bulk product transport between plants, packaged product transport between plants, packaged product transport from each plant to each distribution center, and packaged product transport between distribution centers. A performance metric in these embodiments is expressed in terms of one or more decision variables above.

The third step in the method is a computer implemented step of running an algorithmic solver to manipulate decision variables. The variables are manipulated to identify a solution set of variable values that will move plant operations closer to the optimum for the objective function while satisfying specified constraints.

The fourth step in the method is operating the plant(s) substantially, and preferably precisely, according to the solution obtained. This step is can be performed manually or automatically, but typically, given the nature of the decisions being made, the solution requires intermediate review, discussion and approval by plant planning and/or operating personnel.

Another embodiment of the invention is a decision making tool for identifying an optimal or near optimal operating plan to meet a performance metric for one or more bulk product blending and packaging plant(s). The decision making tool comprises at least three components. The first component in the tool is a computer readable device for storing a data file, wherein the data file contains the data set previously described. The second component in the tool is a computer readable device for storing a mathematical model, wherein the model is as previously described. The third component in the tool is a processor comprising an optimization platform that comprises an algorithmic solver. The optimization platform is operable to load the model, read the data in the data file, populate the model parameters according to the data file, and execute the algorithmic solver. The algorithmic solver is operable to manipulate decision variables in the model to identify the set of variable values that optimize the objective function.

Another embodiment of the invention is a program storage device readable by a computer containing a computer program executable by a computer. The computer program comprises code operable to cause a computer to identify an optimal or near optimal operating plan to meet a performance metric for one or more bulk product blending and packaging plant(s). More particularly, the instructions are operable to cause a computer to perform at least three actions. The first action is retrieve and read a data file, wherein the data file contains the data set previously described. The second action is using the data file to populate model parameters in a mathematical model, wherein the model is as previously described. The third action is executing an algorithmic solver to manipulate decision variables in the model to identify a solution set of variable values that optimize the objective function.

Each of these embodiments provide a unique way for a user to: (1) simultaneously evaluate different decision variables relating to (a) long term plant capacity (e.g., available equipment and people), (b) mid term capacity (e.g., operating shift structures), (c) production decisions (e.g., batch/lot sizes, fill rates, number of production batches, product mix), (d) sourcing/transport decisions (e.g., transporting blended bulk products between plants, transporting packaged products between plants, transporting packaged products from plants to distribution centers, and transporting packaged products between distribution centers), and (e) inventory decisions (e.g., safety stock levels); (2) to identify the best combination of choices that can be made to meet a performance objective, during a given planning period, while still meeting key operating constraints; and (3) to simulate the effect of varying one or more of the decision variables above on a performance metric and/ or on the severity of one or more constraint violations.

For each of these embodiments, a particularly preferred performance metric is cost. In such a preferred embodiment, the methods, tools and programs described herein enable a user to make coordinated capacity, production, sourcing/ transporting, and inventory decisions that will minimize operating cost over a given planning horizon while still meeting key constraints.

These and other features of the invention are set forth in more detail below.

DETAILED DESCRIPTION OF THE INVENTION

Definitions

Unless expressly defined otherwise, all technical and scientific terms used herein have the meaning commonly understood by those of ordinary skill in the art. The following words and phrases have the following meanings:

"Bulk product" means a substantially fluid product that is in a loose unpackaged form. Illustrative bulk products are base stocks for making lube oil, grease, wax, primers, paints, stains and varnishes and additives for the same. Other examples of bulk products include base stocks for liquid detergent, shampoo and conditioner, liquid soap, alcoholic drinks, soft drinks, condiments, and additives for the same.

"Blended product" means a bulk product blended with one or more other bulk products and/or additives. Illustrative blended products include commercial grade lube oils, greases, waxes, primers, paints, stains and varnishes. Other examples of blended product include unpackaged liquid laundry detergent, liquid soap, shampoo and conditioner, body wash, alcoholic drinks, soft drinks, bottled water, and condiments.

"Code" embraces both source code and object code.

"Computer," "processor" and "computer processor," as used interchangeably herein, even when used in the singular, means a single computer or a collection of computers interacting directly or indirectly with one another.

"Computer program" or "computer application," as used interchangeably herein, means a set of instructions written in a computer readable language, such as machine code, intended to be executed on a computer to perform a task.

"Computer-readable medium" includes all physically tangible media in which computer readable data can be stored. Suitable computer-readable media that is non-transitory includes, but is not limited to, storing media, such as magnetic storing media (e.g., ROMs, floppy disks, hard disk, and the like), optical reading media (e.g., CD ROMs (compact disc-read-only memory), DVDs (digital versatile discs), re-writable versions of the optical discs, and the like), hybrid magnetic optical disks, organic disks, system memory (read-only memory, random access memory) and non-volatile memory such as flash memory or any other volatile or non-volatile memory. Computer readable medium also includes cooperating or interconnected computer readable media that are either located in a single processing system or distributed among multiple processing systems that are local or remote to one another.

"Model" is a mathematical description of some or all parts of one or more processes and may be in the form of a single model or a construct of multiple component models.

"Near optimal" or "near optimum," is an approximation of optimal based on, for example, the convergence of sequentially-obtained solutions to the optimal.

"Packaged product" means a blended product that is in a container conventionally for downstream sales (e.g., distributor and retail sales). Illustrative packaged products include blended products stored in cartons, cans, bottles, pails and drums each of which can vary in size. Packaged products are often, in turn, further organized into pallets.

"Parameter," in the context of mathematical models, means an input variable. Accordingly, while parameters in a model of a plant process can vary over time, and from plant to plant, the parameters are configured/populated to match current data for a specific plant before running an optimization of the model for the plant process.

"Slop" is a sample of a product about to be processed on a given set of equipment that is run through the equipment to clean out impurities left over from the processing of other products. Slop is typically discarded as waste due to the resultant impurities therein.

Bulk Product Blending and Packaging Plant

All of methods, tools and programs described herein relate to capacity, production and inventory planning (collectively, "operational planning") for one or more bulk product blending and packaging plant(s). A typical bulk product blending and packaging plant is composed of a network of directly or indirectly interconnected equipment. The network includes a set of blending equipment for blending bulk products. The network further includes one or more storage tanks for storing raw materials, components and blended bulk products. The network further includes filling/packaging equipment for packaging blended products into packaged products. The network further includes packaged product storage facilities (e.g. warehouses) for storing packaged products. Finally, the network further includes unloading and discharging facilities for receiving bulk raw materials from and loading/unloading blended and/or packaged products onto a form of mechanical transportation. Suitable forms of mechanical transportation include, but are not limited to, pipeline, truck, rail, and marine vessel (e.g., barge or ship).

FIG. 1 is a schematic illustration of a typical bulk product blending and packaging plant. As shown in FIG. 1, the plant has a number of blenders (B series) for performing the blending operations. These blenders may be of various types. For example, the blenders may be any combination of in-line blenders (ILB) and/or batch blending tanks in a blend tank farm. Further, each type of blender may be of a different subtype (e.g., a batch blending tank farm may include kettle tanks for manual blending and automatic batch blending (ABB) tanks for automated blending). As shown in FIG. 1, blended bulk products can also be imported (i.e., unloaded) into the plant through the bulk product import facility (BPIF). Similarly, for the packaging operations, the plant has various types of equipment (P series) for filling/packaging bulk products into containers as well as bulk export facilities (D series) for exporting blended bulk products by discharging them onto transport units. The plant also has one or more external (WHS-EXT) and/or internal (WHS-INT) storage warehouse(s) for storing packaged products. In some plants, package products may be stored inside designated, possibly cordoned off, area(s) inside one or more buildings in the plant complex. Shown also in FIG. 1 are facilities for importing raw materials (RMIF) for bringing in base stock and other raw materials and facilities for delivering packaged products to downstream entities in the product supply chain. The facilities for delivering packaged products are represented diagrammatically as the packaged products export facilities (PPEF). In addition to the above facilities a bulk product blending and packaging plant may also have facilities for importing packaged products (PPIF). An actual plant may configure its facilities for importing base stocks and other raw materials, for importing and exporting blended bulk products, for importing and exporting packaged products, and for storing packaged products in ways that include one or more of, but are not limited to, the following: (a) having shared facilities for both importing and exporting blended bulk products as well as for importing other raw materials in bulk form, (b) having shared facilities for importing and exporting packaged products as well as for importing additives in packaged form (in pallets), (c) for importing base stock and other raw materials, and (d) having shared facilities for storing packaged products and additives in packaged form (in pallets).

In the operation of the blending plant shown in FIG. 1, base stock is taken from storage tanks (ST series) that are used to store raw materials and blended with additives to make the blended bulk products. Some of the blended bulk products can be held in dedicated storage tanks (also ST series). This may allow for the packaging operations to be decoupled from the blending operations such that the decision to blend each dedicated blended bulk product may be to replenish the inventory of bulk product in its respective tank. The remaining blended bulk products can be blended on-demand by continuous blenders (e.g., in-line blenders). The blending operations may be limited by the availability of blending equipment and/or the availability of storage tanks into which the blended bulk products are stored for quality assurance (QA) and staging before continuing on to the packaging operations.

The blended bulk products are then conveyed to the packaging operations of the plant. The filling/packaging equipment then fills the blended bulk products into containers (packages) of various sizes to make packaged products. Packaged products made by the filling/packaging equipment may then be stored in a warehouse or a designated area in the plant complex. Also, the plant should have facilities for loading the blended bulk products onto transport units. The packaging operations of the plant may be limited by a number of constraints including the availability of blended bulk products (e.g., from the blending operations) and/or the availability of the filling equipment for filling containers or loading rack transport units.

The products produced by the plant(s) are not particularly limited. Example products include oil-based products, surface coatings, health & personal care products, and food & beverage products. Oil-based products include, but are not limited to, lube oil, waxes and greases. Surface coatings include, but are not limited to, primers, paints, stains, and varnishes. Health & personal care products include, but are not limited to, liquid laundry detergent, liquid soap, shampoo and conditioner, and body wash. Food & beverage products include, but are not limited to, alcoholic beverages, soft drinks (juices and sodas), bottled water, sauces, and condiments.

Distribution Center

In one embodiment, the model described above can be used to describe the behavior of a distribution center by making decisions to set the value of the following decision variables and/or parameters to zero: (a) variables/parameters involving all production equipment including blending equipment, tanks, and filling equipment; (b) variables/parameters involving the bulk product import facilities and the bulk product export facilities; and (c) variables/parameters involving the raw material import facilities.

Method

A first and preferred embodiment of the invention is a method for operating one or more bulk product blending and packaging plant(s). The purpose of the method is to move operations of the blending and packaging plant(s) toward an optimum for a performance metric during a designated time period under designated operating constraints. The optimum for the performance metric will either be maximization or minimization of the performance metric as designated by the method practitioner.

The nature of the performance metric is not particularly limited. Illustrative performance metrics include, but are not limited to, power consumption, total or specific packaged product production, production time, total or specific utilization of plant equipment, operating cost and net profit. Some performance metrics are sought to be maximized while others are sought to be minimized. For the performance metrics of power consumption, production time and operating cost, the method may seek minimization. For the performance metric of net profit, the method may seek maximization. For the performance metrics of total or specific packaged product production and total or specific utilization of plant equipment, the method may seek either minimization or maximization, depending on the circumstances.

Step 1

The first step in the method is a computer implemented step of receiving a data set. Typically, the data set is stored in a data file and this step is only implemented when a user enters a computer command to retrieve and read the data file. Alternatively, this step may be initiated automatically on a periodic basis.

The data set generally comprises information regarding each plant that is useful in making decisions regarding plant capacity, production and inventory. The data set comprises one or more of the following: (a) data identifying a time horizon; (b) data identifying the blending equipment and one or more operational parameters thereof; (c) data identifying the storage tanks and one or more operational parameters thereof; (d) data identifying the packaging equipment and one or more operational parameters thereof; (e) data identifying the packaged product storage facilities and one or more operational parameters thereof; (f) data identifying the unloading and discharging facilities and one or more operational parameters thereof; (g) data relating to the interconnections between plant equipment; and (h) data relating to the historical demand for each packaged product.

Preferably, the data identifying the blending equipment splits out each major piece of equipment individually. This is especially true when different types of blending equipment are utilized by the plant(s). Alternatively, the blending equipment can be identified collectively in one or more groups (e.g., by production train) or even collectively by plant. Similarly, the identity of the storage tanks, packaging equipment, packaged product storage facilities and unloading and discharging facilities can, depending on the circumstances, be identified individually or as one or more groups of equipment.

Preferably, the data identifying the time horizon specifies the time period of plant operations to be optimized. In another embodiment, the time horizon of interest is divided into two or more time intervals during each of which demand for packaged products may vary due to seasonality of demand. In general, the time horizon over which plant operations is to be optimized comprises one or more time intervals. Preferably, the data pertaining to the operational parameters of the blending equipment specifies one or more of the blending equipment cleanup and preparation time, pump rate, requisite number of skilled workers necessary to operate the blending equipment, the blender spindle speeds and the blend rates. Preferably, the data pertaining to the operational parameters of the storage tanks specifies one or more of the storage tank volume (either directly or indirectly by specifying tank diameters and heights from which volume can be calculated), the roof type (e.g., floating or fixed), the bottom type (e.g., cone shaped or flat), the heel volume and the storage tank cleanup and preparation time. Preferably, the data pertaining to the operational parameters of the packaging equipment specifies one or more of the packaging equipment cleanup and preparation time, the packaging rate, the requisite number of skilled workers necessary to operate the packaging equipment and the volumetric bulk product package-filling rate. Preferably, the data pertaining to the operational parameters of the packaged product storage facilities specifies one or more of the availability and capacity of each packaged product warehouse, the size of a batch unit of each packaged product and the average warehouse residence time of each packaged product. Preferably, the data pertaining to the operational parameters of the unloading and discharging facilities specifies one or more of the type of unloading and discharging equipment (e.g., whether for unloading from/discharging onto trucks, railcars, barges, etc.), the unloading/discharge rates for each piece of equipment, the unloading/discharging equipment cleanup and preparation time and the average loading equipment residence time for each product. Preferably, the data relating to the interconnections between plant equipment specifies one or more the physical pipe connectivity linking the blending equipment to one or more tanks and the physical pipe connectivity linking each tank to one or more types of packaging equipment and/or unloading and discharging facilities. Preferably, the data relating to historical demand for each packaged product specifies one or more of the arrival time of customer demand events and, for each demand event, the identity and quantity of the products in the demand event. The method embraces the use of any combination of the data described in this paragraph and, preferably, the method utilizes all the data described in this paragraph.

In many cases, the different bulk products and/or blended products will have notably different compatibilities with the different pieces of plant equipment. This can be due to a number of physical and/or chemical factors including, but not limited to, viscosity, acidity, density, etc. Accordingly, in one embodiment, the data set further comprises data relating to the compatibility of different bulk products and/or blended products with the plant equipment.

In another embodiment, the data set further comprises data relating production shift structures. Illustrative data relating to production shift structures includes, but is not limited to, the following: number of manufacturing/production days, operating shifts per production day; duration of each shift; upper limit on overtime; available workers per shift; and any combination thereof. This data can be defined uniformly for an entire plant or broken down separately for each process step in the plant (e.g., unloading, blending, packaging, warehouse storage and discharging) or broken down even further for each piece of production equipment in the plant.

In some industries, plants have the option to buy blended products and packaged products on the spot market to augment production. Accordingly, in another embodiment, the data further includes the identity and quantity of blended bulk products and/or packaged products that are typically available for spot purchase from third parties and/or associated plant(s) sharing some common ownership and/or operational control ("affiliated plants").

As well be further detailed in later sections, if the performance metric is financial, then the data set will include data pertaining to the costs for operating the plant(s). This data may include, but is not limited to, the costs for operating and maintaining the blending and packaging equipment, the storage tanks, the cost for holding inventory and the cost of operating the loading and unloading equipment. Further, if the performance metric is net profit, the data set will also include some approximation of the financial value of each packaged product produced.

Step 2

The second step in the method is a computer implemented step of using the data set to populate model parameters in a mixed-integer non-linear mathematical optimization model. The model is constructed to mathematically describe the operations of the blending and packaging plant(s) and, in addition to the parameters, comprises decision variables, constraints and an objective function.

The model's decision variables represent the quantitative decisions to be made in each interval regarding plant capacity, production and inventory. For example, the model decision variables may represent the quantitative decisions regarding one or more of the following decision variables: (i) the requisite number of product batches and the size of the batches to be made for each packaged product; (ii) the requisite number of product batches and the size of each batch to be made for each blended product; (iii) whether and when to combine blending operations for like bulk products; (iv) the requisite quantity of equipment including, but not limited to, blending equipment, packaging equipment; storage tanks; and unloading and discharging facilities; (v) whether and when to dedicate a storage tank to a blended product; (vi) the requisite number and length of shifts per day; (vii) the requisite number of workers; (viii) the requisite number of overtime hours; and (ix) the requisite quantity of safety stock to maintain for each packaged product and some blended products. The method embraces the use of a model containing any combination of the decision variables set forth in this paragraph. Preferably, all of the decision variables set forth in this paragraph are present in the model.

Numerous other decision variables pertaining to plant capacity, production and inventory planning may also be included. For example, an additional decision variable that could be included is the identity and quantity of any blended bulk products and/or packaged bulk products to be purchased from third parties and/or affiliated plants to augment production.

The model constraints represent the key operational criteria that must be met for any solution to be feasible. The constraints are not particularly limited. However, the constraints include one or more of the following: (a) one or more terms limiting the availability and capacity of the blending equipment; (b) one or more terms limiting the availability and capacity of the storage tanks; (c) one or more terms limiting the availability of and capacity of the packaging equipment; (d) one or more terms limiting the availability and capacity of the packaged product storage facilities; (e) one or more terms limiting the availability and capacity of the unloading and discharging facilities; (f) one or more non-linear terms relating the number of batches of each packaged product to product batch size; and (g) one or more non-linear terms relating the size of each batch of packaged products to the quantity of safety stock required for the product.

Preferably, the constraints limiting the availability and capacity of the blending equipment specify one or more of the following: (i) limitations on the types and number of each type of the blending equipment that can be utilized; (ii) limitations on production shift structures; (iii) limitations on the availability of workers and their skills or ability to operate the blending equipment; and (iv) limitations on the capability of blending equipment to process particular bulk products. Preferably, the constraints limiting the availability and capacity of the storage tanks specify one or more of the following: (i) restrictions on the physical connectivity linking different pieces of plant equipment (e.g., blending equipment, packaging equipment and/or unloading and discharging facilities) to different storage tanks; (ii) minimum time periods for setting up different storage tanks for receiving a batch of blended bulk product; (iii) minimum time periods for pumping a batch of blended bulk product into a storage tank; (iv) minimum time periods for conducting quality assurance testing on a blended bulk product; (v) minimum time periods for setting up the filling equipment to manufacture a batch of packaged product; and (vi) minimum time periods for pumping blended bulk product out of different storage tanks. Preferably, the constraints limiting the availability and capacity of the packaging equipment specify one or more of the following: (i) limitations on the types and number of each type of packaging equipment that can be utilized; (ii) limitations on the production shift structures; and (iii) limitations on the availability of workers and their skills or ability to operate the packaging equipment. Preferably, the constraints limiting the availability and capacity of the packaged product storage facilities specify one or more of the following: (i) limitations on the size of a warehouse or location in the plant complex where packaged products are stored; (ii) limitations on the residence time of a batch of each packaged product in the warehouse; and (iii) inventory turns of each packaged product. Preferably, the constraints limiting the availability and capacity of the unloading and discharging facilities specify one or more of the following: (i) limitations on the rate at which packaged products can be unloaded/discharged; (ii) limitations on the size of a batch of each packaged product; and (iii) limitations on the residence time of a batch of each packaged product on the unloading/discharging equipment. Typically, at least one constraint relates the number of batches of each packaged product to product batch size does by making the minimum total manufactured quantity of a packaged product (i.e., number of batches multiplied by batch size) correspond to the expected demand for the product. Typically, at least one constraint relates the size of each batch of packaged products to the quantity of safety stock required does by making the level of safety stock for each size of packaged product correspond to the quantity that can fulfill customer demand over a specified length of time (a.k.a. "lead time") during which a replenishment order has been placed. The method embraces the use of a model containing any combination of the constraints described in this paragraph. Preferably, all of the constraints set forth in this paragraph are present in the model.

Numerous additional constraints may also be present. For example, if a decision variable in the model is the identity and quantity of blended bulk product and/or packaged bulk product to be purchased from third parties and/or affiliated plants to augment production, then one or more constraints may exist to limit the identity and quantity of such purchases. For example, one such constraint would be that any such purchases cannot exceed the typical spot market availability of each product.

The objective function of the model is a performance metric. As previously stated, the nature of the performance metric is not particularly limited and illustrative performance metrics include, but are not restricted to, total power consumption, total packaged product production, specific packaged product production, total time for production, utilization of plant equipment, total operating cost and total net profit.

Step 3

The third step in the method is a computer implemented step of running an algorithmic solver to manipulate decision variables in the model. Preferred commercial solvers include CPLEX, XPress, KNITRO, and XA. The decision variables are manipulated to identify a solution set of variable values that will move plant operations closer to the optimum, and preferably to the optimum, for the objective function. Upon initiating this step, the user also decides whether optimization of the objective function means minimization or maximization.

Computer Implementation of Steps 1, 2 and 3

Steps 1, 2 and 3 in the method described above are each computer implemented, meaning that they are accomplished by causing a computer to run a computer program that resides on a computer-readable medium. Typically, the computer program comprises code that loads the mathematical model, retrieves and reads the data set and populates the model parameters according to the data file. The computer program may also define one or more optimization based solution methods. The computer program further comprises code that calls upon an optimization solver which is integral to, or interfaces with, the computer program to solve the math models, through an exact method and/or through one or more heuristics.

Preferably, the code is written using modeling system software such as AIMMS, GAMS, ILOG OPL, AMPL, or XPress Mosel. However, the code could also be written using any computer programming language including C++. In one embodiment, the computer program is written using AIMMS and employs an AIMMS user interface.

In a preferred embodiment, the data entry and storage is accomplished using an Excel interface and the program is written in the AIMMS modeling language and calls upon a CPLEX solver to solve the math modeling problems in the program by using an exact method, or by using one or more heuristics, or by using a combination thereof. In this embodiment, the program utilizes an AIMMS interface for execution and output. The results can then be transferred (e.g., exported or copied) back to Excel and stored as an Excel file. Alternatively, the results can be stored and managed in AIMMS.

In one embodiment, a solution to the MINLP model is obtained by transforming the MINLP model into a mixed integer linear programming (MILP) model by linear approximation and then solving the MILP model iteratively by using a cutting-plane method.

Alternatively, in another embodiment, the MINLP model can be solved by using metaheuristics. Suitable metaheuristics are selected from the group consisting of an evolutionary algorithm, simulated annealing, an ant colony optimization, a tabu search, a pattern search algorithm, or any combination thereof.

In another embodiment, when the mixed-integer non-linear optimization model is posed as a mixed-integer non-linear dynamic program, the model can be solved by using approximate dynamic programming algorithm.

In another embodiment, when the mixed-integer non-linear mathematical optimization is posed as an agent-based model (ABM), the model is solved by using simulation.

Preferably, the solution step is completed in a time frame of two hours or less. Obviously, the processing time will vary depending on the processing capabilities of the computer utilized, the particular optimization platform and solver selected, the particular solving techniques employed and the number of variables and constraints. However, one of the benefits of the invention is that the problem, when set up in a manner analogous to the example provided herein, takes less than two hours to process.

Step 4

The fourth step is operating the plant(s) substantially, and preferably precisely, according to the solution obtained. In other words, decisions regarding plant capacity, plant production and plant inventory are in line with the recommendations provided by the model. An operational plan for operating the plant(s) can be determined after a review of the solution by plant planning and/or operating personnel. Planning personnel may want to vary the parameters and obtain solutions to various "what if" scenarios in order to choose a path that best optimizes the performance metric in view of a variety of scenarios. Alternatively, however, this step can be performed automatically.

Raw Materials

The method may treat the availability of raw materials in any suitable way. In one embodiment, the model assumes infinite availability of raw materials and identifies an optimal or near optimal solution to the modeling problem accordingly. In another embodiment, the availability of specified raw materials is a parameter to be populated from the data set and a constraint in the model is that utilization of specified raw materials cannot exceed availability. In another embodiment, the requisite quantity of raw materials is an additional decision variable to be determined such that a performance metric is driven toward optimal or near optimal value while satisfying limitations and/or constraints on raw material storage thereof.

Multi-Plant

In one embodiment, the method described above is used to optimize the performance of one bulk product blending and packaging plant in isolation. However, in another embodiment, the method described above is used to simultaneously optimize a collection of bulk product blending and packaging plants to capture capacity, production and inventory cooperation benefits between plants.

If the method is practiced simultaneously on a collection of bulk product blending and packaging plants, then the data set described above is provided for each plant in the collection. Further, additional parameters and constraints are included in the model to define the ability, benefits and/or detriments of transporting blended and/or packaged products between plants. The data set includes the data necessary to populate these additional parameters. The additional decision variables for the model will be whether to vary the capacity, production and inventory of one plant in order to make blended and/or packaged product for shipment to another plant.

For example, in a multi-plant embodiment optimized for total cost, the additional parameters and constraints would include the cost of transporting blended and/or packaged product between plants. The additional decision variables for the model would include whether to vary the capacity, production and inventory of one plant in order to make blended and/or packaged product for shipment to another plant. The objective function of total operating cost for the collection of plants, in this embodiment, would include the cost of any buying/selling and transportation of products between the plants.

This multi-plant embodiment is very useful in detecting instances when the cost of expanding capacity to meet demand in plant A is less than the cost of buying and transporting product from, and possibly even expanding capacity at, plant B. Instead of increasing capacity at plant A to meet higher demand, the optimal solution obtained by the method would dedicate some portion of plant B to plant A. It is even possible, depending on the data presented, that the best solution to a multi-plant optimization problem would be for one plant to become a fully dedicated blending plant or a fully dedicated packaging plant for another.

Supply Network

Figure 5:
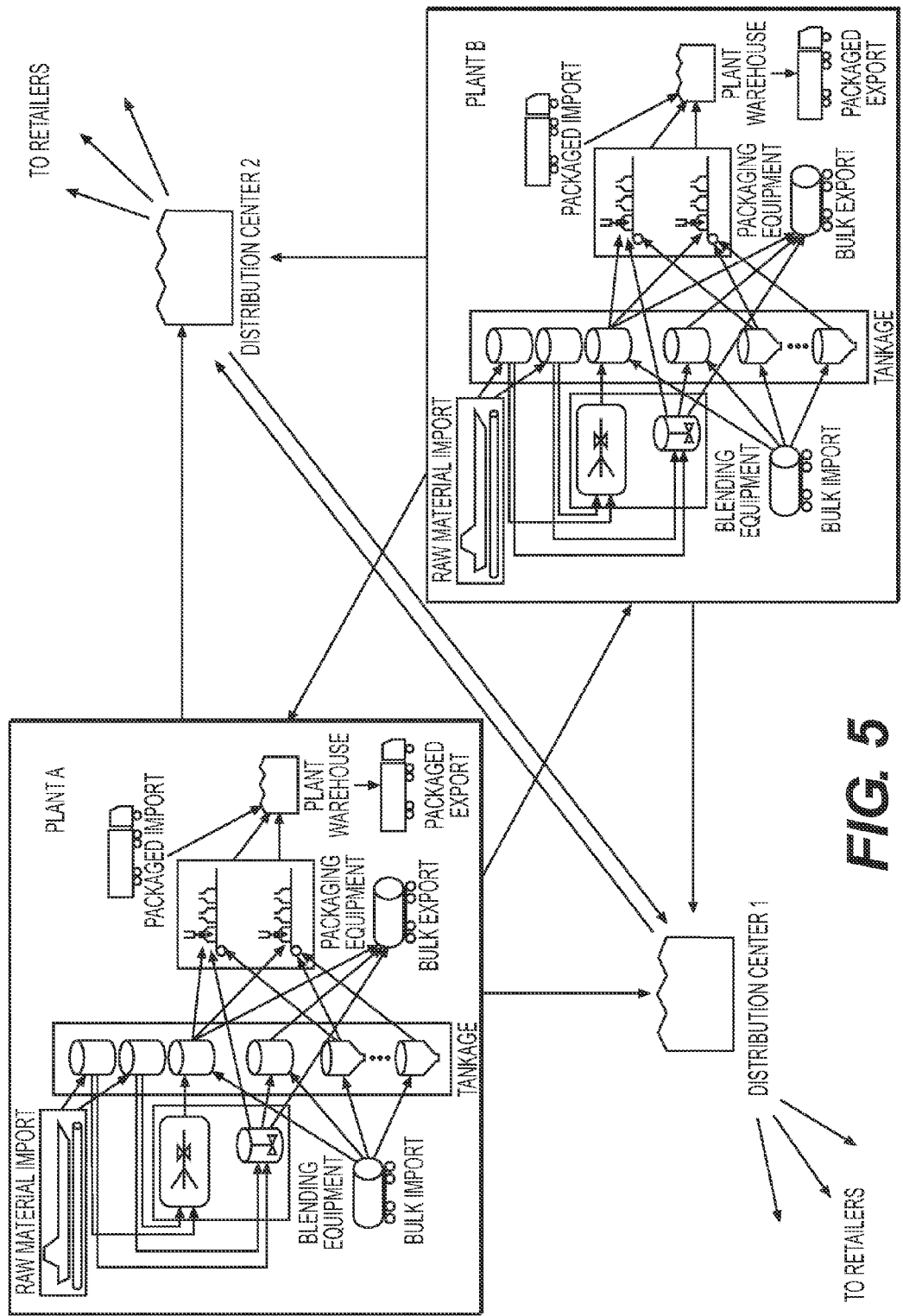
FIG. 5 shows an example of a supply network in a zone or geographic market location that can be modeled by certain embodiments of the invention.

In one embodiment, the method described above is used to simultaneously optimize a collection of bulk product blending and packaging plants and a collection of distribution centers in a zone or geographic market to capture the benefits of having preferred plant(s) and distribution center(s) to supply each specified packaged product for meeting retail sales of the packaged product in the zone as depicted in FIG. 5.

If the method is practiced simultaneously on a collection of bulk product blending and packaging plants and a collection of distribution centers in a zone or geographic market, then the data set described above is provided for each plant and each distribution center. Further, additional parameters and constraints are included in the model to define: (a) the ability, benefits and/or detriments of transporting blended products between plants; (b) the ability, benefits and/or detriments of transporting packaged products from each plant to each distribution center; and (c) the ability, benefits and/or detriments of transporting packaged products between distribution centers. The data set includes the data necessary to populate these additional parameters. The additional decision variables for the model will be: (a) whether to vary the capacity, production and inventory of one plant in order to make blended products for shipment to another plant; (b) whether to have one or more preferred plants for supplying each specified packaged product to each distribution center; and (c) where to hold pooled safety stock for each packaged product.

For example, in a supply network embodiment optimized for total cost, the additional parameters and constraints would include: (a) the cost of transporting blended products between plants; (b) the cost of transporting packaged products from each plant to each distribution center; and (c) the cost of transporting packaged products between distribution centers. The additional decision variables for the model would include: (a) whether to vary the capacity, production and inventory of one plant in order to make blended products for shipment to another plant; (b) whether to have one or more preferred plants for supplying each specified packaged product to each distribution center; and (c) where to hold pooled safety stock each packaged product. The objective function of total operating cost for the collection of plants, in this embodiment, would include the cost of any buying/selling and transportation of blended products between the plants and the cost of any buying/selling and transportation of packaged products between the distribution centers.

This supply network embodiment is very useful in detecting instances when meeting demand in one region of the zone costs the least when the products are manufactured at a plant located in another region that is also in the zone. Instead of increasing capacity a plant located in the same region to meet higher demand in that region, the optimal solution obtained by the method would essentially establish preference for supplying products to a distribution center in one region from a plant located in another region of the zone. In addition to the above, it is even possible, depending on the data presented, that the best solution to a supply network optimization problem would be for one plant to become a fully dedicated blending plant for one region or a fully dedicated packaging plant for another region in the zone.

Order Fulfillment

The method may treat demand fulfillment in any suitable way. Demand data typically includes historical customer orders. These historical customer orders can be used to calculate a demand probability distribution for each packaged product. An order fulfillment rate is calculated from the demand probability distribution, safety stock, and production lead time for a bulk product blending and packaging plant (for a distribution center, an order fulfillment rate depends on the demand probability distribution, safety stock, and replenishment lead time). In one embodiment, an order fulfillment rate is created as a constraint in the model that must be met by any feasible solution. Production and inventory (e.g., safety stock) for each plant or replenishment and inventory for each applicable distribution center are then calculated in view of the customer order fulfillment rate constraint and the demand probability distribution. In another embodiment, the customer order fulfillment rate constraint specifies the minimum target that must be achieved in determining an optimum solution. Alternatively in another embodiment, the order fulfillment rate can be a decision variable to be manipulated (subject to minimum-value constraints) in the model, in view of the demand probability distribution and other factors, to determine an optimum solution to the objective function.

Cost Minimization

In a particularly preferred embodiment, the method described above is a method for operating one or more bulk product blending and packaging plant(s) and one or more applicable distribution center(s) in a manner that reduces total operating cost during a designated time horizon under designated operating constraints. In other words, the objective function is operating cost and the datasets provided are the data necessary to determine operating cost.

Accordingly, the first step in this cost minimization embodiment of the method is a computer implemented step of receiving a data set. In this case, the data set includes one or more of the following data: (a) data identifying a time horizon comprising one or more time intervals; (b) data identifying the blending equipment and data relating to the cost of operating the blending equipment; (c) data identifying the storage tanks and data relating to the cost of operating the storage tanks; (d) data identifying the packaging equipment and data relating to the cost of operating the packaging equipment; (e) data identifying packaged product storage facilities and data relating to the cost of holding inventory for packaged products; (f) data identifying unloading and discharging facilities and data relating to the cost of operating the facilities; (g) data relating to the interconnections between plant equipment; (h) data relating to the historical demand for each packaged product; and (i) data relating to investment necessary to add plant equipment and divestment necessary to remove plant equipment. In an embodiment that simultaneously drives operations at two or more plants toward an optimum, additional required datasets comprise datasets defining the ability, benefits and/or detriments of transporting blended and/or packaged products between plants. In an embodiment that includes one or more distribution center(s), additional required datasets comprise (a) a dataset identifying the distribution center(s) and one or more operational parameters thereof; (b) a dataset defining the ability, benefits, and/or detriments of transporting blended products between plants; (c) a dataset defining the ability, benefits, and/or detriments of transporting packaged products from each plant to each distribution center; and (d) a dataset defining the ability, benefits, and/or detriments of transporting packaged products between applicable distribution centers.

In one embodiment, the data relating to the costs of operating the blending equipment and the packaging equipment include the cost of overtime. In another embodiment, the data relating to the costs of operating the blending equipment and the packaging equipment include the cost of the slop generated. In another embodiment, the data relating to the cost of holding inventory is a function of inventory level. In another embodiment, the data set further comprises data relating to the cost of maintaining plant equipment (e.g., the blending equipment, storage tanks, packaging equipment, warehouses and/or unloading/discharging equipment). In another embodiment, the data set further comprises data relating to the cost of operating a production shift structure and the cost of changing from one production shift structure to another. In another embodiment, the data set further comprises data relating to the cost of employing specified number of workers. In another embodiment, the data set further comprises data relating to the cost of operating a distribution center. Preferably, the data meets some combination, and preferably all, of the limitations in this paragraph.

The second step in this in this cost minimization embodiment of the method is a computer implemented step of using the data set to populate model parameters a mixed-integer non-linear mathematical optimization model constructed to mathematically describe the operations of the blending and packaging plant(s). Again, the model comprises decision variables, constraints and an objective function. Again, the variables represent quantitative decisions to be made in each interval regarding plant capacity, production and inventory and in certain embodiment distribution center capacity and inventory. Again, the constraints include one or more of the following: (a) one or more terms limiting the availability and capacity of the blending equipment; (b) one or more terms limiting the availability and capacity of the storage tanks; (c) one or more terms limiting the availability of and capacity of the packaging equipment; (d) one or more terms limiting the availability and capacity of packaged product storage facilities; (e) one or more terms limiting the availability and capacity of unloading and discharging facilities; (f) one or more non-linear terms relating the number of batches of each packaged product to product batch size; and (g) one or more non-linear terms relating the size of each batch of packaged products to the quantity of safety stock required for the product. In an embodiment that optimizes a supply network, additional constraints include one or more terms limiting the availability and capacity of the distribution center(s).

As stated, in this embodiment, the objective function is operating cost. This total operating cost typically includes, but is not necessarily limited to, the cost for operating the blending equipment, the cost for operating the packaging equipment and the cost for holding inventory. In one embodiment, the total operating cost also includes the cost of maintaining plant equipment (e.g., the blending equipment, storage tanks, packaging equipment, warehouses and unloading/discharging facilities). In another embodiment, the total operating cost also includes the cost of adding and/or removing plant equipment. In another embodiment, the total operating cost also includes the cost of adding and/or removing distribution center as well as the cost of maintaining distribution center of specified size. Preferably, the total operating cost meets some combination, and preferably all, of the constraints in this paragraph.

The third step is a computer implemented step of running an algorithmic solver to manipulate the decision variables in the model to obtain a solution set of variable values that optimizes the objective function (i.e., total operating cost). In this case, optimization of the objective function means minimization.

The fourth step is operating the plant(s) substantially according to the solution obtained. Preferably, the plant(s) are operated exactly according to the solution obtained.

Multi-Interval

The time horizon over which a performance metric is to be optimized comprises one or more time intervals. In one embodiment, the method described above is used to optimize the performance over a time horizon comprising one interval. In another embodiment, the method is applied over a time horizon comprising two or more intervals. Optimizing a performance metric over two or more intervals may become necessary when demand for packaged products varies over time, e.g., due to seasonality, in an emerging market, or in a declining market. The multi-interval embodiment requires additional dataset describing time-varying nature of demand in the specified time horizon in the form of demand expectation for every time intervals inside the horizon.

If, for example, the method is practiced to optimize a performance index amidst seasonal demand for packaged products, an optimization algorithm can determine optimal production mix, batch size, whether to combine batches, production shift structure, and safety stock for both blended bulk and packaged products for every time interval in the time horizon. Among such decisions are, but not limited to, in which time interval inventory decisions of seasonal packaged products and/or of blended bulk products that make up the seasonal packaged products should be increased in anticipation of increased demand for such products due to seasonality while a performance index is still optimized.

If the method is practiced amidst increasing demand such as the case in an emerging market, an optimization algorithm can determine in which time interval capacity decision variables should be increased in value thus increasing production capacity of one or more plants in terms of available time that can be utilized to produce more products or more quantity of each of or most of the blended bulk and/or packaged products. Because inventory decisions such as, but are not limited to, replenishment quantity and safety stock are considered simultaneously with capacity and production variables, an optimization algorithm can determine that the inventory level, starting from the time interval in which capacity is increased, can be lowered while a performance index is still driven toward its optimal or near optimal value.

Decision Making Tool

Another embodiment of the invention is a decision making tool for identifying an optimal or near optimal operating plan to meet a performance metric for one or more bulk product blending and packaging plant(s). As set forth below, the tool comprises at least three components to implement steps 1, 2 and 3 of the method.

The first component is a first computer readable memory device storing a data file. The computer readable memory device may be any computer readable medium as the phrase is defined in the definition section.

The data file stored on the computer readable memory device contains the data set described in step 1 of the method. Accordingly, the data file includes one or more of the following: (a) data identifying a time horizon; (b) data identifying plant blending equipment and one or more operational parameters thereof; (c) data identifying the plant storage tanks and one or more operational parameters thereof; (d) data identifying plant packaging equipment and one or more operational parameters thereof; (e) data identifying packaged product storage facilities and one or more operational parameters thereof; (f) data identifying unloading and discharging facilities and one or more operational parameters thereof; (g) data relating to the interconnections between plant equipment; and (h) data relating to the historical demand for each packaged product. In an embodiment that simultaneously drives operations at two or more plants toward an optimum, additional required datasets comprise datasets defining the ability, benefits and/or detriments of transporting blended and/or packaged products between plants. In an embodiment that includes one or more distribution center(s), additional required datasets comprise (a) a dataset identifying the distribution center(s) and one or more operational parameters thereof; (b) a dataset defining the ability, benefits, and/or detriments of transporting blended products between plants; (c) a dataset defining the ability, benefits, and/or detriments of transporting packaged products from each plant to each distribution center; and (d) a dataset defining the ability, benefits, and/or detriments of transporting packaged products between applicable distribution centers. The data file can contain a data set corresponding to any embodiment, or combination of embodiments, of the data set described in step 1 of the method. Preferably, the data file contains the data necessary to calculate operating cost.

The second component is a second computer readable memory device that stores a mathematical model comprising parameters that describes the operations of a blending and packaging plant. This second computer readable memory device may be the same as the first computer readable device. Alternatively, the first and second computer readable devices may be separate and distinct. Regardless, the second computer readable device, like the first, may be any computer readable medium as the phrase is defined in the definition section.

The model is as described in step 2 of the method. Accordingly, the model, in addition to the parameters, comprises decision variables, constraints, and an objective function. Again, the variables represent quantitative decisions to be made in each interval regarding plant capacity, production and inventory. Again, the constraints include one or more of the following: (a) one or more terms limiting the availability and capacity of blending equipment; (b) one or more terms limiting the availability and capacity of storage tanks; (c) one or more terms limiting the availability and capacity of the packaging equipment; (d) one or more terms limiting the availability and capacity of the packaged product storage facilities; (e) one or more terms limiting the availability and capacity of the unloading and discharging facilities; (f) one or more non-linear terms relating the number of batches of each packaged product to product batch size; and (g) one or more non-linear terms relating the size of each batch of packaged products to the quantity of safety stock required for the product. An additional set of constraints to include in an embodiment that optimizes a supply network involves one or more terms limiting the availability and capacity of the distribution center(s). Again, the objective function is a performance metric. The model may correspond to any embodiment, or any combination of embodiments, described in step 1 of the method. Accordingly, in a preferred example, the objective function is operating cost.

The third component is a processor comprising an optimization platform that comprises an algorithmic solver. The optimization platform is operable to load the model, read the data file, populate the model parameters according to the data file, and execute the algorithmic solver. The algorithmic solver, in turn, is operable to manipulate decision variables in the model to identify the set of variable values that optimize the objective function. In the case of operating cost, this means minimizing the objective function. Preferred solvers include CPLEX, XPress, KNITRO, and XA.

Preferably, the optimization platform is a computer application comprising code written using modeling system software such as AIMMS, GAMS, ILOG OPL, AMPL, or XPress Mosel. However, the code could also be written using any computer programming language including, but is not limited to, C++.

In one preferred embodiment, the computer application is written using AIMMS and employs an AIMMS user interface. More particularly, data entry and storage is accomplished using an Excel interface, the model is written in the AIMS modeling language, and a program written in the AIMMS modeling language loads the model, populates parameters in the model with the data set in the data file and calls upon a CPLEX solver to solve the math modeling problem (i.e., identify a solution that optimizes the objective function) using an exact method, or using one or more heuristics, or using a combination thereof. In this embodiment, the program utilizes an AIMMS interface for execution and output. The results can then be transferred (e.g., exported or copied) back to Excel and stored as an Excel file. Alternatively, the results can be stored and managed in AIMMS.

Computer Program

Another embodiment of the invention is a program storage device, readable by a computer, containing a computer program executable by a computer, wherein the computer program comprises code operable to cause a computer to identify an optimal or near optimal operating plan to meet a performance metric for one or more bulk product blending and packaging plant(s). As set forth below, the program of instructions are operable to cause a computer, acting, for example, as part of a tool such as the decision making tool described above, to perform steps 1, 2 and 3 of the method.

First, the program of instructions is operable to cause a computer, either at the command of a user or automatically, to retrieve and read a data file from a computer readable storage device. The computer readable storage device may be any computer readable medium as the phrase is defined in the definition section.

The data file contains the data set described in step 1 of the method. Accordingly, the data file includes one or more of the following: (a) data identifying a time horizon; (b) data identifying plant blending equipment and one or more operational parameters thereof; (c) data identifying the plant storage tanks and one or more operational parameters thereof; (d) data identifying plant packaging equipment and one or more operational parameters thereof; (e) data identifying packaged product storage facilities and one or more operational parameters thereof; (f) data identifying unloading and discharging facilities and one or more operational parameters thereof; (g) data relating to the interconnections between plant equipment; and (h) data relating to the historical demand for each packaged product. In an embodiment that simultaneously drives operations at two or more plants toward an optimum, additional required datasets comprise datasets defining the ability, benefits and/or detriments of transporting blended and/or packaged products between plants. In an embodiment that includes one or more distribution center(s), additional required datasets comprise (a) a dataset identifying the distribution center(s) and one or more operational parameters thereof; (b) a dataset defining the ability, benefits, and/or detriments of transporting blended products between plants; (c) a dataset defining the ability, benefits, and/or detriments of transporting packaged products from each plant to each distribution center; and (d) a dataset defining the ability, benefits, and/or detriments of transporting packaged products between applicable distribution centers. The data file can contain a data set corresponding to any embodiment, or combination of embodiments, of the data set described in step 1 of the method. Preferably, the data file contains the data necessary to calculate operating cost.

Second, the program of instructions is operable to thereafter cause the computer, either automatically or with manual intervention, to load a model and use the data file to populate model parameters in the model. The model is a mixed-integer non-linear mathematical optimization model, stored on a computer readable storage device, constructed to mathematically describe the operations of the blending and packaging plant(s). This second computer storage device may be the same as the first computer readable storage device. Alternatively, the first and second computer readable storage devices may be separate and distinct. Regardless, the second computer readable storage device, like the first, may be any computer readable medium as the phrase is defined in the definition section.

The model is as described in step 2 of the method. Accordingly, the model, in addition to the parameters, comprises decision variables, constraints, and an objective function. Again, the variables represent quantitative decisions to be made in each interval regarding plant capacity, production and inventory. Again, the constraints include one or more of the following: (a) one or more terms limiting the availability and capacity of blending equipment; (b) one or more terms limiting the availability and capacity of storage tanks; (c) one or more terms limiting the availability and capacity of the packaging equipment; (d) one or more terms limiting the availability and capacity of the packaged product storage facilities; (e) one or more terms limiting the availability and capacity of the unloading and discharging facilities; (f) one or more non-linear terms relating the number of batches of each packaged product to product batch size; and (g) one or more non-linear terms relating the size of each batch of packaged products to the quantity of safety stock required for the product. An additional set of constraints to include in an embodiment that optimizes a supply network involves one or more terms limiting the availability and capacity of the distribution center(s). Again, the objective function is a plant performance metric. The model may correspond to any embodiment, or any combination of embodiments, described in step 1 of the method. Accordingly, in a preferred example, the objective function is operating cost.

Third, the program of instructions is operable to thereafter cause the computer to execute, either automatically or with manual intervention, an algorithmic solver to manipulate decision variables in the model to identify a solution set of variable values that optimize the objective function. In the case of operating cost, this means minimizing the objective function. Preferred solvers include CPLEX, XPress, KNITRO, and XA.

Preferably, the program of instructions is written in the language of modeling system software such as AIMMS, GAMS, ILOG OPL, AMPL, or XPress Mosel. However, the code could also be written using any computer programming language including, and is not limited to, C++.

In one preferred embodiment, the program of instructions is written using AIMMS and employs an AIMMS user interface. More particularly, data entry and storage is accomplished using an Excel interface, the model is written in the AIMS modeling language, and a program written in the AIMMS modeling language loads the model, populates parameters in the model with the data set in the data file and calls upon a CPLEX solver to solve the math modeling problem (i.e., identify a solution that optimizes the objective function) using an exact method, or using one or more heuristics, or using a combination thereof. In this embodiment, the program utilizes an AIMMS interface for execution and output. The results can then be transferred (e.g., exported or copied) back to Excel and stored as an Excel file. Alternatively, the results can be stored and managed in AIMMS.

EXAMPLE

Plant Cost Optimization

The following particular example describes the invention in more detail as it pertains to the cost optimization of the capacity, production and inventory of one or more bulk product blending and packaging plant(s) wherein the required quantities of raw materials are calculated from the resulting analysis.

In a blending and packaging plant, production of the plant (e.g., quantity of packaged products produced or volume of blended bulk products transported out via outbound logistic facility) in a given period depends on the operating capacity of such plant. Operating capacity of a blending and packaging plant depends on net (effective) available time for production during which plant equipment can produce products (i.e., blend raw materials into bulk blended products, store the blended products in storage tanks while waiting for quality assurance testing and certification, and fill the bulk products into containers of various sizes as packaged products). Net available time for production, in turn, depends on available time for production minus time required to clean up and prepare the plant equipment as distinctly different products are manufactured in sequence.

Available time for production at a plant depends on its capacity variables comprising the amount of plant equipment, the operating shift structure of the plant, overtime and the number of workers available to operate the equipment at the plant. Decisions to adjust the aforementioned capacity variables alter the ability of said plant to make a sufficient quantity of products to meet customer demand. Increased demand can certainly be met by making decisions to add one or more of the following: equipment, production shifts, workers, overtime or any combination thereof. In lieu of decisions to increase capacity to meet increased demand, a production planner/manager may opt to buy some bulk products, or some packaged products, or both. This decision typically involves sourcing from other plants in the supply network (i.e., sourcing from other plants owned by the same company or an affiliate or from third party. When buying externally, the purchasing plant pays a premium.

One way to adjust capacity is to adjust the amount of equipment by adding or removing one or more pieces of equipment. Changing the amount of equipment requires investment in the form of new purchases, or requires a salvage cost of disposal, each of which is incurred once (i.e., at the moment the decision to change the number of equipment is made and implemented). When adding equipment, in addition to direct new purchase costs, additional investment may be required, for example, for site construction, installation, etc. Disposing of equipment sometimes recovers a portion of the investment in the discarded equipment in the form of salvage value of such discarded equipment.

A plant typically manufactures a plurality of products necessitating plant equipment to switch from one to another. Switching requires that the plant equipment be cleaned and prepped after completion of a product prior to starting production on the next. This is done for quality reasons, e.g., to avoid contamination, to meet product specs, etc. Cleaning and prep time, which may vary according to the type of product and/or equipment used to manufacture such product, can significantly reduce the net available time for production at plant equipment. As such, a plant will manufacture several quantities of like product in a batch to gain economies of scale in making such product. The size of a batch of product to manufacture can thus be a production decision variable that a plant production planner/manager needs to make.

Changing the amount of equipment can be quite costly both in monetary terms as well as in speed of implementation. A faster and often cheaper way to adjust capacity is by adjusting overtime and/or operating shift structure. Overtime extends the normal production hours per shift such that a plant can produce more with the equipment and people it has and may be specified in a contractual agreement between the firm and its labor union and governed by local labor laws. For example, there may be a limit on overtime to increase capacity imposed by local labor laws or labor contracts and a limit to a reduction in work hours to decrease capacity by labor contracts that require workers in a plant be paid for a specified number of hours per week regardless of the actual operating hours of the plant.

Operating shift structure of a plant involves number of production or manufacturing days (calendar days minus idle weekend days minus holidays), number of shifts per production days and number of hours per shift. A change in shift structures may often require a change in labor. Labor includes the number of workers and their skills or knowledge to operate plant equipment. A plant typically employs a specified number of workers per shift who can operate specified kinds of equipment. Each kind of equipment in turns may require a certain number of workers to operate. Hiring new workers may require training to ensure the newly-hired workers acquire skills or knowledge to adequately operate plant equipment. Firing experienced workers may result in loss of knowledge or skills. Acquisition and loss of knowledge as a result of hiring/firing decisions can be accounted for in the cost of hiring/firing workers to increase or decrease available time for production.

A blending and packaging plant typically manufactures a plurality of finished products that customers buy. A plant production planner/manager makes decisions on what products to make by deciding the number of batches of each product to produce and the size of each batch of each product. In this example, quantities of raw materials are explicitly excluded from the list of constraints such that a plant production planner/manager uses the results to calculate the required quantities of raw materials and the number of storage tanks needed to store the raw materials to support the resulting operating plan. To execute this decision requires a plant to have sufficient number of hours to manufacture all batches and complete the cleanup and prep steps for each batch. These time requirements can be expressed as follows:

Packaging equipment requisite time =
$$\sum_{j \in PACKAGING} \sum_{f \in PACK} n_{j,f} \cdot (\tau_{j,f} + Q_{j,f}/r_{j,f})$$

Blend equipment requisite time =
$$\sum_{i \in BLENDING} \sum_{b \in BULK} \sum_{j \in PACKAGING} \sum_{f \in PACK}$$
$$\{\delta_{i,b} \cdot sgn(M_{b,f}) \cdot n_{j,f} \cdot (\tau_{i,b} + 1/r_{i,b} \cdot \delta_{i,b} \cdot M_{b,f} \cdot Q_{j,f})\} +$$
$$\sum_{i \in BLENDING} \sum_{b \in BULK} n_{i,b} \cdot (\tau_{i,b} + Q_{i,b}/r_{i,b})$$

Discharging facility requisite time =
$$\sum_{i \in BLENDING} \sum_{x \in DISCHARGING} \sum_{b \in BULK} n_{i,b} \cdot (\tau_{x,b} + Q_{i,b}/r_{x,b})$$

and

Tanks requisite time =
$$\sum_{i \in BLENDING} \sum_{t \in TANK} \sum_{b \in BULK} \sum_{j \in PACKAGING} \sum_{f \in PACK}$$
$$\left\{ \begin{array}{c} \delta_{i,b} \cdot sgn(M_{b,f}) \cdot n_{j,f} \cdot \\ [\tau_{t,b} \cdot \delta_{i,b} \cdot M_{b,f} \cdot Q_{j,f} \cdot (1/r_{t,i,b} + 1/r_{t,j,b}) + C_b + \tau_{j,f}] \end{array} \right\} +$$
$$\sum_{u \in UNLOADING} \sum_{t \in TANK} \sum_{b \in BULK} \sum_{j \in PACKAGING} \sum_{f \in PACK}$$
$$\left\{ \begin{array}{c} \delta_{u,b} \cdot sgn(M_{b,f}) \cdot n_{j,f} \cdot \\ [\tau_{t,b} \cdot \delta_{u,b} \cdot M_{b,f} \cdot Q_{j,f} \cdot (1/r_{t,u,b} + 1/r_{t,j,b}) + C_b + \tau_{j,f}] \end{array} \right\} +$$
$$\sum_{i \in BLENDING} \sum_{t \in TANK} \sum_{b \in BULK} \sum_{x \in DISCHARGING} n_{i,b} \cdot$$
$$[\tau_{t,b} + Q_{i,b} \cdot (1/r_{t,i,b} + 1/r_{t,x,b}) + C_b + \tau_{x,b}]$$

Wherein the following terms have the following meanings:
BLENDING is a set of blending equipment, indexed i;
BULK is a set of bulk products, manufactured and imported, indexed b;
TANK is a set of non-dedicated bulk or intermediate storage tanks, indexed t;
PACKAGING is a set of packaging equipment, indexed j;
PACK is a set of packaged products, indexed f;
UNLOADING is a set of unloading facilities, indexed u; and
DISCHARGING is a set of discharging facilities, indexed x.

And wherein the following variables have the following meanings:
$n_{i,b}$: number of batches of bulk product b to be produced using blender i to meet demand for such bulk product that will be shipped to customers as bulk product—this can be input as expected number of batches;

$Q_{i,b}$: batch size of bulk product b to be blended in blending equipment i to meet independent demand for such bulk product that will be shipped to customers as bulk product—this can be input as the size of the expected number of batches above;

$n_{j,f}$: number of batches of packaged product f to be produced using packaging equipment j;

$Q_{j,f}$: batch size of packaged product f to be made in packaging equipment j;

$\tau_{i,b}$: cleanup and prep time for blender i to make bulk product b;

$\tau_{x,b}$: cleanup and prep time for discharging facility x to dispense bulk product b;

$\tau_{j,f}$: cleanup and prep time for packaging equipment j to make packaged product f;

$\tau_{t,b}$: cleanup and prep time for tank t to store bulk product b before it is packaged;

$r_{i,b}$: rate of blending product b by blender i;

$r_{x,b}$: rate of dispensing product b through discharging facility x;

$r_{j,f}$: rate of packaging product f by packaging equipment j;

$r_{t,i,b}$: rate of pumping bulk product b from blender i into bulk product storage tank t;

$r_{t,x,b}$: rate of pumping bulk product b from tank t into a transportation device (e.g., trucks, railcars, etc.) through discharging facility x—typically is equal to $r_{x,b}$;

$r_{t,j,f}$: rate of pumping bulk product f out of bulk product storage tank t into packaging equipment j;

$C_b$: quality testing and certification time requirement to ensure a bulk product b∈BULK meets specifications;

$M_{b,f}$: volume of bulk product b in one container of package product f;

$\delta_{i,b}$: assignment/decision to blend bulk product b on blend equipment i whereby $\Sigma_{i \in BLENDING} \delta_{i,b} \geq 1$ for each product b manufactured in the plant and $\Sigma_i \delta_{i,b} = 0$ when specific product b imported into the plant;

$\delta_{u,b}$: assignment/decision to buy/import bulk product b to be unloaded on unloading equipment u whereby $\Sigma_{u \in UNLOADING} \delta_{u,b} \geq 1$ for specific imported product b in the case $\Sigma_i \delta_{i,b} = 0$ with $\Sigma_i \delta_{u,b} = 0$ for every manufactured product b; and sgn(·): sign function, i.e., +1 when argument is positive, −1 when negative and 0 otherwise.

To ensure that customer demand for packaged or finish products is met, the total production quantity of each packaged product must at least meet its expected demand $D_f$. This requires the following equation to be met:

$$\sum_{j \in PACKAGING} n_{j,f} Q_{j,f} \geq D_f,$$

for all products f∈PACK
As applicable, the total production volume of bulk products to meet independent demand for bulk products $D_b$ such that:

$$\sum_{i \in BLENDING} n_{i,b} Q_{i,b} \geq D_b,$$

for all products b∈BULK
In addition to cleanup and prep time, during the manufacture of a batch of a product, the rate of operation of each piece of production equipment plays an important role in determining requisite time to complete the production of said product.

In addition to adding equipment, increasing capacity can be realized by upgrading to equipment with faster rates and/or shorter cleanup and prep time for the products that can be manufactured by such equipment. A plant often can meet customer demand by merely selecting the best available production equipment to manufacture each product. This selection is essentially a production decision to be made by a plant production planner/manager.

To ensure the above production decisions can be executed properly, a plant needs to have the requisite production hours met by having sufficient production time made available on the plant's production resources comprising equipment, operating hours, and workers. In a typical blending and packaging plant, the total hours available on a given piece of blending equipment i is a function of the shift structure decision at the plant. A shift structure may comprise decisions on the number of manufacturing days, number of shifts per manufacturing day and number of hours or length of a production shift. The requisite production hours to manufacture blended products b∈BULK must be less than the available hours for production such that:

$$\sum_{i \in BLENDING} \sum_{b \in BULK} \sum_{j \in PACKAGING} \sum_{f \in PACK}$$
$$\{\delta_{i,b} \cdot \text{sgn}(M_{b,f}) \cdot n_{j,f} \cdot (\tau_{i,b} + 1/r_{i,b} \cdot \delta_{i,b} \cdot M_{b,f} \cdot Q_{j,f})\} +$$
$$\sum_{i \in BLENDING} \sum_{b \in BULK} n_{i,b} \cdot (\tau_{i,b} + Q_{i,b}/r_{i,b}) \le \sum_{i \in BLENDING} (d'_i S_i h'_i + \beta_i)$$

Wherein the following variables have the following meanings
- $d'_i$: manufacturing days blender i is available for production;
- $S_i$: shifts per manufacturing day blender i is available for production;
- $h'_i$: hours per shift blender i is operated for production; and
- $\beta_i$: overtime hours for blender i.

Similarly, the requisite production hours to manufacture packaged products f∈PACK must be less than the available hours for production such that:

$$\sum_{j \in PACKAGING} \sum_{f \in PACK} n_{j,f} \cdot (\tau_{j,f} + Q_{j,f}/r_{j,f}) \le \sum_{j \in PACKAGING} (d'_j S_j h'_j + \beta_j)$$

herein the symbol descriptions for package equipment j are exactly the same as those for blender i above with appropriate subscript substitution.

In addition to availability of plant equipment to meet the requisite time (hours) for production, availability of skilled workers imposes a limit on the maximum quantity of products that a plant can manufacture. Skilled workers are required to do cleanup and prep tasks during the operating hours of plant equipment as well as to tend the equipment while being operated. Most of plant equipment is automated such that skilled workers need to spend only a specified length of time to monitor said equipment. This requirement can be represented mathematically as follows:

$$\sum_{i \in BLENDING} \sum_{b \in BULK} (\omega_i \cdot \tilde{n}_{i,b} \cdot \tau_{i,b} + \eta_i) \le$$
$$\sum_{i \in BLENDING} e_i (h'_i \cdot d'_i + \beta_i) \le \sum_{i \in BLENDING} e_i \cdot (1 + \overline{\beta}) \cdot H$$

-continued
$$\sum_{j \in PACKAGING} \sum_{f \in PACK} (\omega_j \cdot n_{j,f} \cdot \tau_{j,f} + \eta_j) \le$$
$$\sum_{j \in PACKAGING} e_j \cdot (h'_j \cdot d'_j + \beta_j) \le \sum_{j \in PACKAGING} e_j \cdot (1 + \overline{\beta}) \cdot H$$

Wherein the following variables have the following meaning:
- $\tilde{n}_{i,b}$: total number of dependent and independent batches of b on i;
- $\omega_{(\cdot)}$: skilled workers needed on equipment (·) to complete cleanup and prep tasks;
- $\eta_{(\cdot)}$: requisite time equipment (·) must be tended and monitored during operation;
- $e_{(\cdot)}$: skilled workers assigned to equipment (·);
- H: normal working hours for each skilled worker; and
- $\overline{\beta}$: maximum overtime percentage that a worker can work overtime, may be set by local labor laws or employment contract.

In one embodiment discharging facilities are tended by external operator(s) of a transportation device such that the facilities are not necessarily constrained. In another embodiment, discharging facilities are tended by internal operator(s) of a plant and, as such, their availability is constrained in the following manner:

$$\sum_{i \in BLENDING} \sum_{x \in DISCHARGING} \sum_{b \in BULK} (\omega_x \cdot n_{i,b} \cdot \tau_{x,b} + \eta_x) \le$$
$$\sum_{x \in DISCHARGING} e_x \cdot (h'_x \cdot d'_x + \beta_x) \le \sum_{x \in DISCHARGING} e_x \cdot (1 + \overline{\beta}) \cdot H$$

Note that in a preferred embodiment, the above constraints on requisite time on each production resource (i.e., each set of blending and packaging equipment and discharging facilities) should be imposed on each individual piece of equipment therein.

Each blended bulk product b∈BULK may need certification, a process that requires testing of such product against its specifications while it resides in a bulk product storage tanks that act as intermediate storage. As such a blending operation requires availability of intermediate storage for testing and certification and a packaging operation requires sufficient volume of a blended bulk product. The requisite number of tanks for raw materials is determined by the required quantity of raw materials for making bulk products to meet demand for packaged products and bulk product shipments. The requisite number of tanks for bulk product storage must be such that the tanks can store the quantity of bulk products to meet customer demand for packaged products as well as bulk product shipments. If bulk product for every packaged product is blended on demand, the requisite time to store bulk product during quality testing and certification is such that:

$$\sum_{i \in BLENDING} \sum_{t \in TANK} \sum_{b \in BULK} \sum_{j \in PACKAGING} \sum_{f \in PACK}$$
$$\left\{ \begin{array}{c} \delta_{i,b} \cdot \text{sgn}(M_{b,f}) \cdot n_{j,f} \cdot \\ [\tau_{t,b} \cdot \delta_{i,b} \cdot M_{b,f} \cdot Q_{j,f} \cdot (1/r_{t,i,b} + 1/r_{t,j,b}) + C_b + \tau_{j,f}] \end{array} \right\} +$$
$$\sum_{u \in UNLOADING} \sum_{t \in TANK} \sum_{b \in BULK} \sum_{j \in PACKAGING} \sum_{f \in PACK}$$

-continued $$\left\{\begin{array}{l}\delta_{u,b}\cdot\text{sgn}(M_{b,f})\cdot n_{j,f}\cdot\\ [\tau_{t,b}\cdot\delta_{u,b}\cdot M_{b,f}\cdot Q_{j,f}\cdot(1/r_{t,u,b}+1/r_{t,j,b})+C_b+\tau_{j,f}]\end{array}\right\}+$$

$$\sum_{i\in BLENDING}\sum_{t\in TANK}\sum_{b\in BULK}\sum_{x\in DISCHARGING}n_{i,b}\cdot$$

$$[\tau_{i,b}+Q_{i,b}\cdot(1/r_{t,i,b}+1/r_{t,x,b})+C_b+\tau_{x,f}]\le\sum_{t\in TANK}(d'_tS_th'_t+\beta_t)$$

Among the decisions that must be made in the expression above are the following: (a) the decision to assign storage tank t to receive bulk product b from blending equipment i; (b) the decision to assign storage tank t to receive imported bulk product b from unloading facility u; and (c) the decision to assign packaging equipment j to use in producing package product f that contains bulk product b from tank t.

In addition to the above constraints on time requirement, which in a preferred embodiment should be imposed on individual tank or tank cluster t, each batch of bulk product must fit in a tank in which the bulk product is stored while awaiting quality testing and certification. Expressed mathematically:

$(Q_{i,b})\le V_t$ for product b on equipment i to meet independent demand; and $(\delta_{i,b}\cdot M_{b,f}\cdot Q_{j,f})_t\le V_t$ for product b on equipment i to meet dependent demand for f on equipment j $(\delta_{u,b}\cdot M_{b,f}\cdot Q_{j,f})_t\le V_t$ for imported product b on equipment u to meet dependent demand for f on equipment j Having bigger batches delivers economies of the scale by spreading the cleanup and prep time over a larger quantity, it also increases the wait time of the next batches of products to be produced to a point that the actual replenishment lead time exceeds normal replenishment lead time. This requires ordering replenishment earlier than otherwise to meet customer demand during the actual replenishment lead time. The inventory level at which a replenishment order for a product is issued to the factory is commonly referred to as the replenishment reorder quantity that in this case also serves as safety stock. Ordering earlier means keeping larger quantity of safety stock; this can be costly and yield mediocre performance with respect to a performance metric. When making the replenishment decision, a plant inventory planner/manager, in essence, decides on the level of safety stock for packaged products. This invention allows one to make quantitative decisions on capacity (e.g., requisite number of equipment, shift structures, overtime, workers, etc.), inventory (e.g., safety stock), and production (e.g., number of batches, batch sizes, etc.) simultaneously.

The above requisite time on blending equipment may further be reduced, thus reducing the need to have additional equipment, by combining production batches of bulk products and/or dedicating some tanks for certain bulk products. Combining production batches amounts to producing a batch of like product large enough to meet the volume requirement of a plurality of packaged products. This increases the time occupancy of bulk storage tanks while reduces the requisite time on the blending equipment. A decision to combine production batches involves grouping the set of packaged products into clustered subsets of combined package products. Each subset contains one or more packaged products that consume like bulk product such that the increase in tank occupancy time due to having a larger batch of bulk product to be packaged into a plurality of packaged products does not violate the constraints ensuring that requisite time for storage tanks be less than or equal to the available time for the tanks. The decision making tool is capable of selecting a combined blending decision by balancing the beneficial reduction in the load on the blending equipment against the adverse increase in residence time on storage tanks. In making a decision about whether to combine blends, the decision-making tool may take into consideration constraints that are specific to combined blends. For example, such constraints may include one or more of the following:

(1) constraints on which blending equipment can perform combined blending;
(2) constraints on which storage tanks can accept combined blends;
(3) constraints on the selection of storage tanks and/or blending equipment based on the size (e.g., volume) of the combined blend; for example, only certain blending equipment and/or storage tanks may be capable of handling the larger volume required by combined blends;
(4) constraints on the size of the combined blends; and
(5) constraints on tank volume and/or time usage when blends are combined; for example, a maximum permissible increase in tank usage time may be specified for each plant, which can be determined by plant managers based on operational experience.

If the decision-making tool decides to combine blends, in some cases, the decision-making tool may further decide whether to dedicate a storage tank to combined blends. In making a decision to dedicate one or more storage tanks to combined blends, the decision-making tool may consider the tank volume and/or time usage when a storage tank is dedicated as compared to the same parameters when a storage tank is not dedicated.

Combining the production decision can be expressed as entries in a matrix $\Sigma$ whose element $\sigma_{f',f}$ is a decision to combine several packaged products f in each combined-blend packaged product f', that is:

$\sigma_{f',f}=1$ if f belongs to the combined cluster f' and $\sigma_{f',f}=0$ otherwise.

This set of decisions must be such that a combined-blend packaged product group must have at least one actual packaged product and each actual packaged product must be in only one combined-blend packaged product group, or:

$\Sigma_f\sigma_{f',f}\ge 1$ and $\Sigma_{f'}\sigma_{f',f}=1$, respectively.

The above essentially involves forming a set of COMBINED-PACK whose member f' is a subset within the set of packaged products, PACK, comprising several packaged products containing like bulk product. The requisite time constraint on the blending equipment, after combining production, is then given by:

$$\sum_{i\in BLENDING}\sum_{b\in BULK}\sum_{f'\in COMBINEDPACK}[n_{i,b,f'}\cdot(\tau_{i,b}+Q_{i,b,f'}/r_{i,b})]+$$

$$\sum_{i\in BLENDING}\sum_{b\in BULK}n_{i,b}\cdot(\tau_{i,b}+Q_{i,b}/r_{i,b})\le\sum_{i\in BLENDING}(d'_iS_ih'_i+\beta_i)$$

Wherein the following variables have the following meaning:

$n_{i,b,f'}$: number of batches of product b by blender i for combined-blend packaged product f'; and $Q_{i,b,f'}$: size of each batch of product b by blender i for combined-blend packaged product f'.

In one embodiment, the above decision necessitates adjusting the production decisions for the affected packaged products such that the number of production batches for each affected packaged products is equal to a single value that is the number of production batches for blending the like bulk product in the packaged products. This is required to ensure the storage tank(s) used in the combining-blend decision is empty after production of the last affected packaged product in a combined-blend packaged product set is complete. In this case:

$$\sum_{i \in BLENDING} \sum_{t \in TANK} \sum_{b \in BULK} \sum_{f' \in COMBINEDPACK}$$

$$\left\{ \left[ \begin{array}{c} n_{i,b,f'} \cdot \\ \tau_{i,b} + Q_{i,b,f'} / r_{t,i,b} + C_b + \\ \sum_{j \in PACKAGING} \sum_{f \in f'} (\delta_{i,b} \cdot M_{b,f} \cdot Q_{j,f} / r_{t,j,b} + \varepsilon_{t,j,f}) \end{array} \right] \right\} +$$

$$\sum_{u \in UNLOADING} \sum_{t \in TANK} \sum_{b \in BULK} \sum_{j \in PACKAGING} \sum_{f \in PACK}$$

$$\left\{ \begin{array}{c} \delta_{u,b} \cdot \text{sgn}(M_{b,f}) \cdot \\ n_{j,f} \cdot [\tau_{t,b} \cdot \delta_{u,b} \cdot M_{b,f} \cdot Q_{j,f} \cdot (1/r_{t,u,b} + 1/r_{t,j,b}) + C_b + \tau_{j,f}] \end{array} \right\} +$$

$$\sum_{i \in BLENDING} \sum_{t \in TANK} \sum_{b \in BULK} \sum_{x \in DISCHARGING}$$

$$n_{i,b} \cdot [\tau_{i,b} + Q_{i,b} \cdot (1/r_{t,i,b} + 1/r_{t,x,b}) + C_b] \leq$$

$$\sum_{t \in TANK} (d'_t S_t h'_t + \beta_t)$$

Wherein the following terms have the following meanings:

$\varepsilon_{t,j,f}$: additional residence time in tank t, greater than or equal to zero in value, of like bulk product in producing packaged product f∈f' on packaging equipment j.

Figure 2:
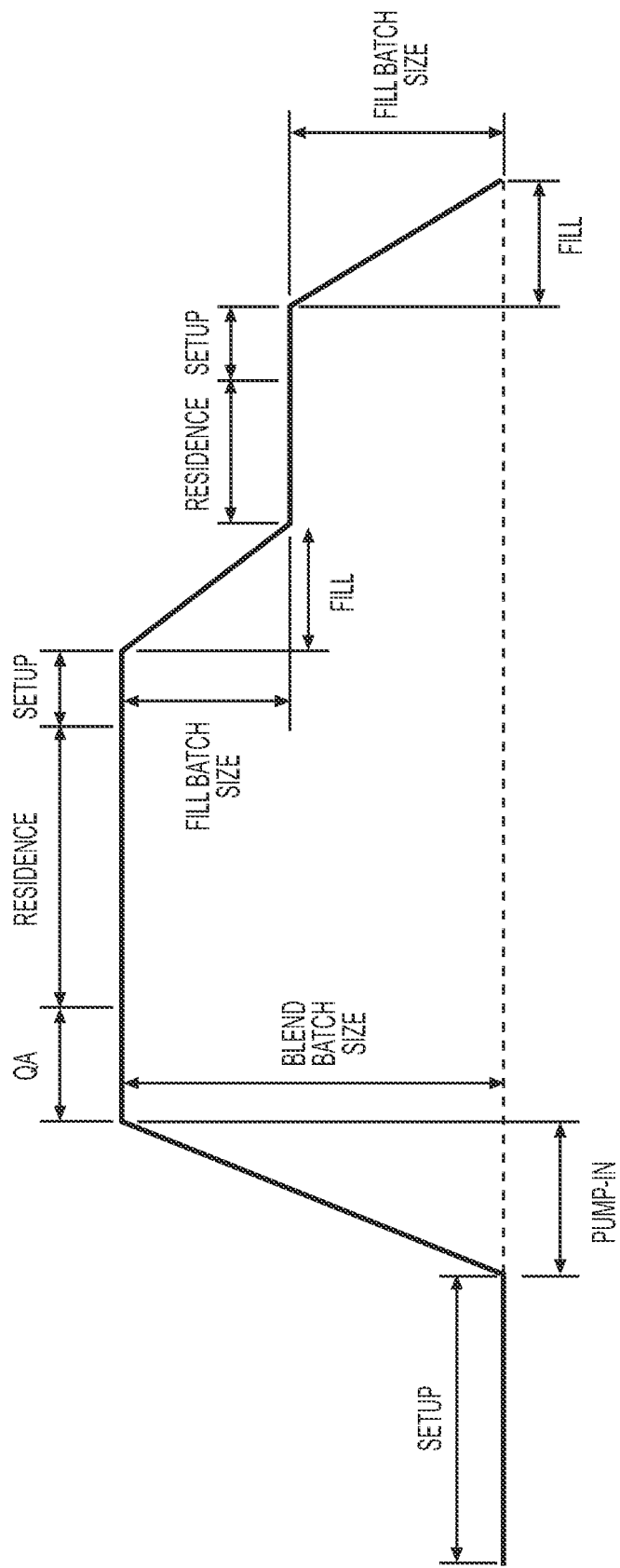
FIG. 2 shows various activities in the use of a storage tank represented as time consumption according to certain embodiments of the invention.

FIG. 2 represents pictorially the requisite time on a bulk storage tank for the case wherein production batches for like bulk product consumed in producing two packaged products are combined. The requisite time requires that a tank be available to receive the bulk product throughout each of the following periods: (a) while tank is set up (cleaned and prepped up); (b) while bulk-product is pumped into the tank; (c) while the bulk product awaits quality assurance and certification; (d) while waiting for the necessary packaging equipment to be setup and for additional residence time that may be necessary due to the combined-blend decision; and (e) while the bulk-product is being packaged (i.e., filled) into the two packaged products. In FIG. 2, the blend needed for the two packaged products are combined and then pumped out separately in two stages. The first pumping-out stage is for the packaging operations for the first packaged product and the second pumping out stage is for the packaging operations for the second packaged product.

Figure 3:
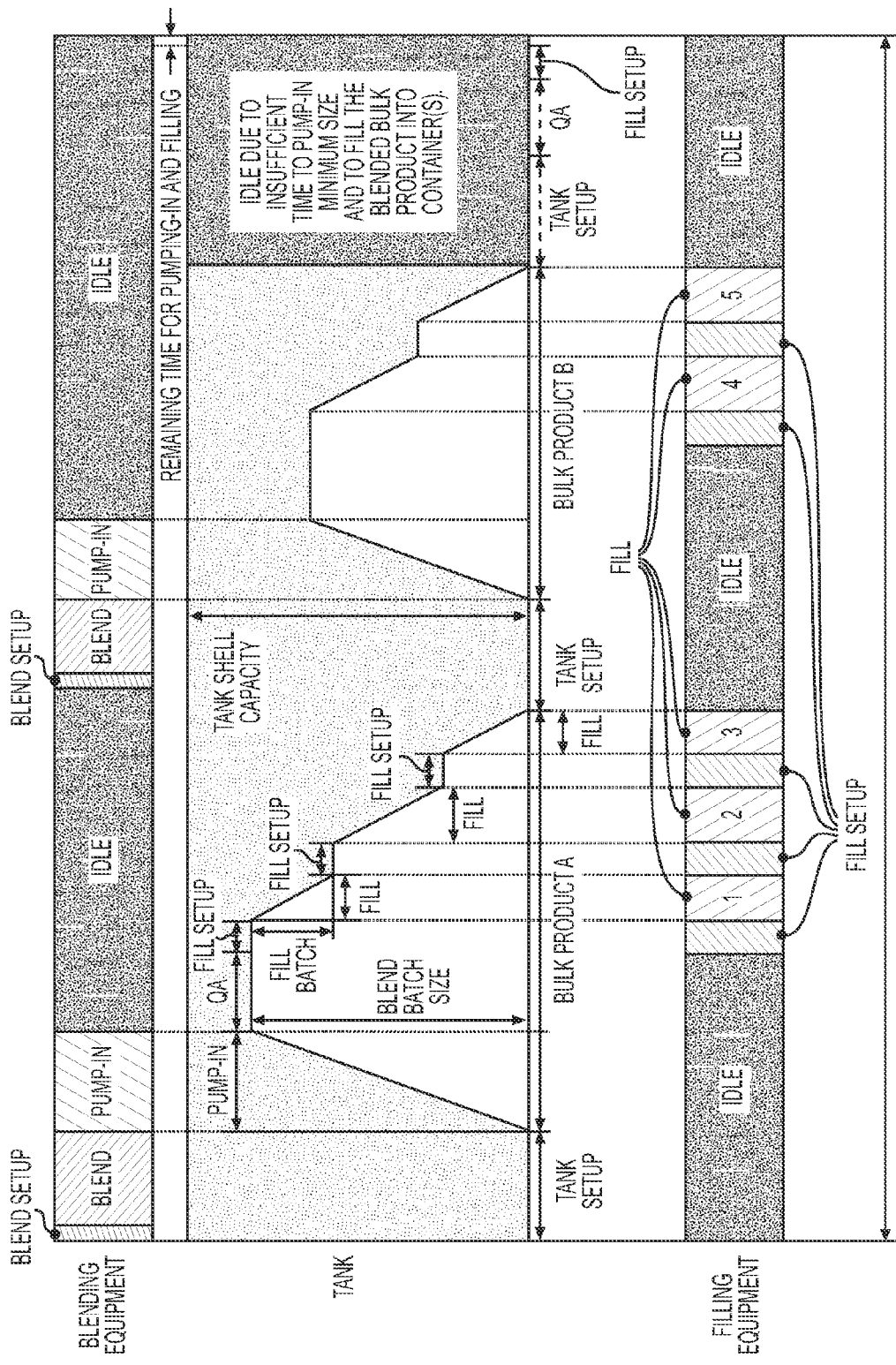
FIG. 3 shows the interaction among a blending equipment, a tank, and a filling/packaging equipment that depicts the effect of product mix and batch size decisions on the available time for production at the blending and filling/packaging equipment.

FIG. 3 depicts the interaction among a blending equipment, a storage tank, and a filling/packaging equipment that shows the impact of combining batches, product mix and batch size production decisions on the quantity of each product that can be produced in one production shift. In FIG. 3, the decision to combine batches in blending bulk product A to be packaged into packaged products 1, 2, and 3 and that in blending bulk product B into packaged products 4 and 5 cause the blending equipment, storage tank, and filling/packaging equipment to experience high percentage of idle time that may yield suboptimal performance metric. By using an optimization algorithm, values of categorical and quantitative decisions can be determined to drive the performance metric toward its optimal or near optimal value.

Figure 4:
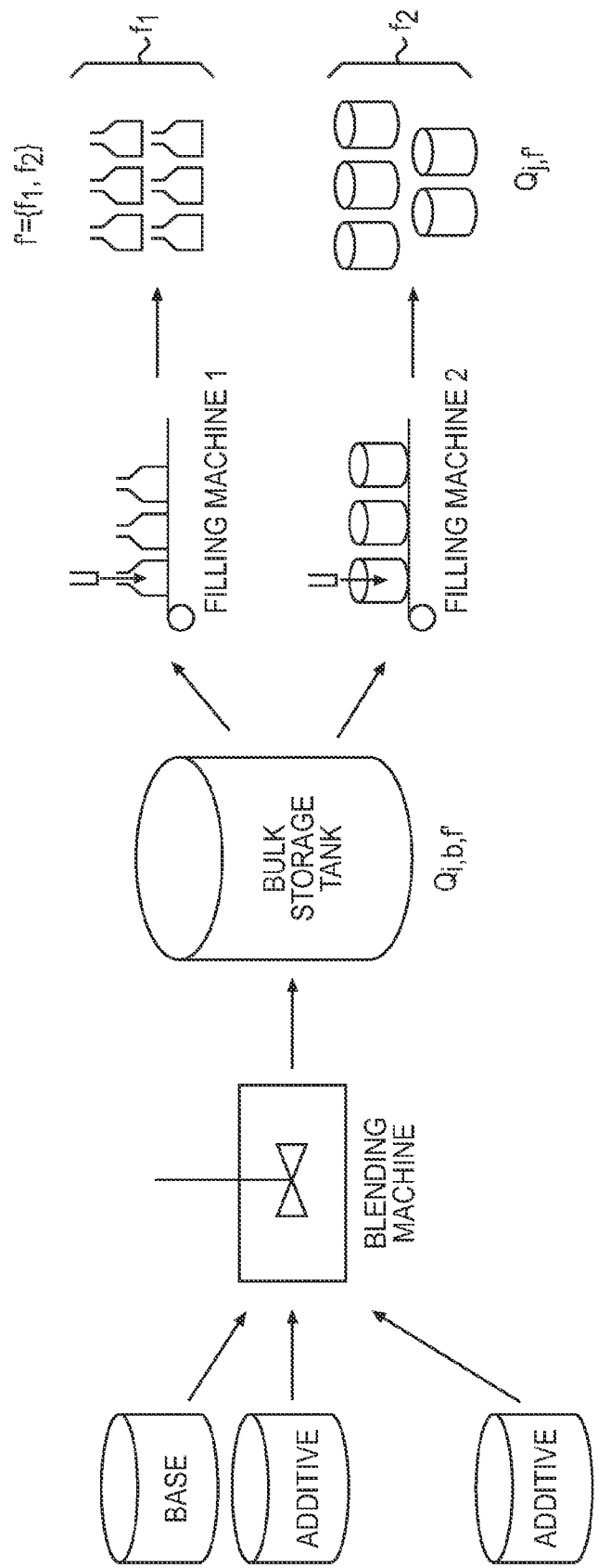
FIG. 4 shows how combined blending may be performed according to a solution obtained by certain embodiments of the invention.

FIG. 4 shows pictorially the decision to combine production batches for the like bulk product in a plurality of packaged products. The like bulk product will be produced with a batch size large enough to meet the dependent demand for such bulk product to produce the packaged products. More specifically, suppose the production order for the plant includes two different types of products ($f_1$ and $f_2$) that share a common blended lube oil product b. The decision-making tool may determine that these two different types of lube oil products should be grouped together in f' as a single demand for blending purposes. The plant is operated to take base stock and additives from the raw material tanks and blend them using blending equipment i to make a batch $Q_{i,b,f'}$ of a blended lube oil product. This batch of blended lube oil product is filled into containers by filling equipment/to produce a batch $Q_{i,f}$ for each of $f_1$ and $f_2$ in the production order. Thus, different families of products may be grouped together for combined blending to reduce manufacturing costs. For example, if the blend needed to make the two different types of lube oil products ($f_1$ and $f_2$) were made in separate batches, extra set-up costs would have been incurred in the manufacturing process. Of course, the model considers the increased inventory holding cost resulting from the increased blend batch size in making the decision to combine blending.

In addition to the time requirement above, the production batch size for the bulk products must fit in a tank into which the bulk products will be stored. This can be expressed mathematically as the following constraints:

$(Q_{i,b})_t \leq V_t$ for product b on equipment i to meet independent demand; and $(Q_{i,b,f'})_t \leq V_t$ for product b on equipment i to meet dependent demand for combined-blend packaged product f'.

$(\delta_{u,b} \cdot M_{b,f} \cdot Q_{j,f})_t \leq V_t$ for imported product b on equipment u to meet dependent demand for f on equipment j In another embodiment, the above synchronization is not necessary if the storage tank(s) used in the decision is (are) dedicated to store the like bulk product. In this embodiment, producing packaged products becomes decoupled from producing the like bulk product in these packaged products. If producing like bulk product is decoupled from producing packaged products, then dependent demand for the said bulk product to ensure meeting demand for packaged products at a desired demand fulfillment level is met by maintaining inventory of bulk product. A preferred embodiment is to have both in the model for a solver to determine a configuration yielding an optimum performance metric.

To accommodate both in the model requires packaged product set PACK be divided into two subsets: DEDICATEDPACK comprising of packaged products containing like bulk products having dedicated storage tanks and COMBINEDPACK containing like bulk products having no specific storage tanks and bulk product set BULK be divided into DEDICATEDBULK comprising bulk products that have dedicated storage tanks and BULK comprising bulk products without any dedicated tanks. The requisite times for the plant equipment are, for this embodiment, given by:

Packaging equipment requisite time =

$$\sum_{j \in PACKAGING} \sum_{\substack{f \in DEDICATEDPACK \\ +COMBINEDPACK}} n_{j,f} \cdot (\tau_{j,f} + Q_{j,f}/r_{j,f})$$

Blend equipment requisite time =

$$\sum_{i \in BLENDING} \sum_{b \in DEDICATEDBULK} \hat{n}_{i,b} \cdot (\tau_{i,b} + \hat{Q}_{i,b}/r_{i,b}) +$$

-continued $$\sum_{i \in BLENDING} \sum_{b \in BULK} \sum_{f' \in COMBINEDBULK} \left[ \frac{n_{i,b,f'} \cdot}{(\tau_{i,b} + Q_{i,b,f'} / r_{i,b})} \right] +$$

$$\sum_{i \in BLENDING} \sum_{b \in BULK} n_{i,b} \cdot (\tau_{i,b} + Q_{i,b} / r_{i,b})$$

Discharging facility requisite time $= \sum_{i \in BLENDING} \sum_{x \in DISCHARGING} \sum_{b \in BULK} n_{i,b} \cdot$ $$(\tau_{x,b} + Q_{i,b} / r_{x,b}) +$$

$$\sum_{i \in BLENDING} \sum_{x \in DISCHARGING} \sum_{b \in DEDICATEDBULK} n_{i,b} \cdot$$

$$(\tau_{x,b} + Q_{i,b} / r_{x,b})$$

Non-dedicated tanks requisite time =

$$\sum_{i \in BLENDING} \sum_{t \in TANK} \sum_{b \in BULK} \sum_{f' \in COMBINEDPACK}$$

$$\left\{ \begin{bmatrix} n_{i,b,f'} \cdot \\ \tau_{i,b} + Q_{i,b,f'} / r_{t,i,b} + C_b + \\ \sum_{j \in PACKAGING} \sum_{f \in f'} (\delta_{i,b} \cdot M_{b,f} \cdot Q_{j,f} / r_{t,j,b} + \varepsilon_{t,j,f}) \end{bmatrix} \right\} +$$

$$\sum_{u \in UNLOADING} \sum_{t \in TANK} \sum_{b \in BULK} \sum_{j \in PACKAGING} \sum_{f \in PACK}$$

$$\left\{ \begin{matrix} \delta_{u,b} \cdot \text{sgn}(M_{b,f}) \cdot \\ n_{j,f} \cdot [\tau_{t,b} \cdot \delta_{u,b} \cdot M_{b,f} \cdot Q_{j,f} \cdot (1/r_{t,u,b} + 1/r_{t,j,b}) + C_b + \tau_{j,f}] \end{matrix} \right\} +$$

$$\sum_{i \in BLENDING} \sum_{t \in TANK} \sum_{b \in BULK} \sum_{x \in DISCHARGING}$$

$$n_{i,b} \cdot [\tau_{i,b} + Q_{i,b} \cdot (1/r_{t,i,b} + 1/r_{t,x,b}) + C_b]$$

Constraints on requisite times in this embodiment are similar to those in that involving combined-blending without dedicating tanks. In addition, production decisions to make blended bulk products having dedicated storage tanks must meet:

$$\sum_{i \in BLENDING} \hat{n}_{i,b} \cdot \hat{Q}_{i,b} \geq$$

$$\sum_{j \in PACKAGING} \sum_{f \in DEDICATEDPACK} [\text{sgn}(M_{b,f}) \cdot n_{j,f} \cdot M_{b,f} \cdot Q_{j,f}] +$$

$$\sum_{i \in BLENDING} n_{i,b} \cdot Q_{ib}$$

In a plant, there may be restrictions on the flow of bulk products from one component of the plant to another based on, for example, compatibilities or connectivity. For example, in FIG. 1, the arrows from the blending equipment and the storage tanks represent the connectivity that allows the flow of products from one component to the other. From the storage tanks, the blended bulk products may then proceed to one of various types of filling equipment or loaded onto a discharging facility (e.g., truck, barge, or railroad car). The arrows from the storage tanks to the filling equipment represent the connectivity that allows for the flow of products from a storage tank to a filling equipment or discharging facility. As such, in the operation of the plant shown in FIG. 1, one or more of the following may apply:

(1) certain products may be restricted to certain methods of blending, and/or vice versa;
(2) certain products may be restricted to certain blending equipment, and/or vice versa;
(3) certain products may be restricted to certain storage tanks, and/or vice versa;
(4) certain products may be restricted to certain filling equipment, and/or vice versa;
(5) certain products may be restricted to certain discharging facility types, and/or vice versa;
(6) certain products may be restricted to certain warehouse space, and/or vice versa;
(7) certain blending equipment may only supply certain storage tanks, and/or vice versa for storage tanks receiving from blending equipment;
(8) certain blended bulk product imports may only supply certain storage tanks, and/or vice versa for storage tanks receiving imported blended bulk products;
(9) certain storage tanks may only supply certain filling equipment, and/or vice versa for filling equipment receiving from storage tanks;
(10) certain storage tanks may only supply certain discharging facilities, and/or vice versa for unloading facilities delivering to storage tanks; and
(11) certain filling equipment may only supply certain warehouse spaces, and/or vice versa for warehouse spaces receiving the packaged products from the filling equipment.

Costs of Adjusting Overtime

One way of adjusting capacity in the short term is to use overtime. As such, in some embodiments, the decision-making tool may account for the cost of using overtime. In practice, the amount of overtime may be constrained by legal, regulatory, or contractual requirements. Such requirements may be expressed as limits on overtime in the model. In some cases, there may also be a cost associated with the use of overtime (being either positive or negative), which may also be factored into the model. Negative overtime is a way to temporarily reduce plant capacity. The cost of using overtime is generally a function of the amount of overtime, which can be non-linear in terms of overtime usage, and can be typically proportional to the amount of overtime except when the amount is negative. When negative overtime is used to temporarily reduced capacity, a positive cost may still be incurred due to labor laws or contractual agreements that require labor receive compensation based on agreed hours regardless of the actual working hours.

Cost of Adjusting Production Assets/Equipment

In some embodiments, the decision-making tool may account for capacity adjustments made by adding or disposing of production assets or equipment. The cost of changing the number of production equipment includes setup (including site construction) and purchase costs for adding equipment, and/or the discard and disposal (salvage value) costs for removing equipment. The decision-making tool may assume that the purchase cost is a function of the additional number of production equipment; it is common to have the total purchase cost be proportional to the additional number of production equipment. The tool may also assume that the disposal cost is a function of the reduction in the number of production equipment; it is common to have the cost be proportional to the reduction in the number of production equipment. When reducing the number of production equipment, a plant may incur cost to discard said equipment for it having to pay for clean-up as well as disposal fees. In some instances, a plant may recover its investment by collecting salvage value of said equipment that is accounted in the model as negative disposal cost.

Cost of Operating and Maintaining Plant and its Equipment

In some cases, the decision-making tool may factor in the cost of operating and maintaining the plant including its production equipment. This may include the cost of owning, operating, and/or maintaining product lines. This cost can assumed to be a function the number of production equipment. It may be common to assume that the cost is proportional to the number of production equipment and to the time such production equipment are being utilized.

Cost of Adjusting Workers

In some embodiments, the decision-making tool may account for capacity adjustments by adding or disposing of workers. The tool uses the costs associated with the addition or reduction of workers. The cost of changing the number of workers may include integration and hiring costs for increasing the number of workers, and/or severance costs for reducing the number of workers. Integration and reduction costs are typically a function of the adjustment that, in some cases, may be assumed to be a constant value or independent of the adjustment. Hiring costs are commonly a function of the additional number of workers that, in some cases, may be assumed to be proportional to the additional number of workers. In reducing the number of workers, a plant may incur severance cost that is commonly a function of the reduction in the number of workers which can be assumed to be proportional to the reduction in the number of workers.

Changeover Costs

In some embodiments, the decision-making may account for costs related to changeover from producing one product to another. In general, smaller batch sizes will lead to higher changeover costs and/or lower throughput. There may be various costs associated with changeovers. One such cost is the cost of slop, which are materials that are trapped in the system between product changeovers and are wasted when the lines are flushed. For example, the slop may be raw base stock oil or blended bulk product that is wasted during changeover of blending or packaging equipment, either preceding or subsequent to the blending or packaging operations, respectively. The cost of slop may be expressed as some monetary value of the slop per unit quantity (e.g., per liter). Changeovers costs can also be incurred during out-bound logistics activities at the rack transport units.

Inventory Holding Costs

In some embodiments, the decision-making tool accounts for the holding of inventory as a cost penalty (e.g., cost per year of holding a pallet of packaged products). Inventory holding costs may be calculated using various techniques. For example, the cost function for holding inventory may be proportional to the inventory levels, with the proportionality factor representing the cost of holding one unit of the inventory in a given time period. Inventory levels will vary according to the type of inventory policy. In some cases, the replenishment policy for products is (r,Q) in which a replenishment order is released when the inventory level reaches the reorder point r. The size of this replenishment order is the batch size Q that is held constant throughout the production period. Another type of policy is the (s,S) base stock policy, whereby a replenishment order is released when the inventory level falls below the minimum level s. The replenishment order brings the inventory level to the base stock level S. The inventory levels for use in the calculation of inventory holding costs depend on safety stock that can be calculated for a given reorder point and demand fulfillment rate. The cost of holding inventory can assumed to be proportional to the average level of inventory that can be approximated by the sum of the safety stock and half of the replenishment batch size.

Cross Shipment Costs

Cross shipment costs may include the costs for importing blended bulk products or packaged products into the plant, sometimes from another plant in the supply network. The cross shipment costs are commonly a function of the imported volume or quantity of bulk or packaged products, respectively. The imported volume or quantity of bulk or packaged products, respectively, are decision variables such that an optimization algorithm can compare the total cost of manufacturing products in a plant, including the cost of adjusting capacity, to the total cost of importing such products and recommend make-v-buy decisions that minimize total cost. In an embodiment that optimizes the performance of a supply network, an additional cost element of cross shipment costs is the cost to ship packaged products between distribution centers. In this embodiment, an optimization algorithm can compare the economy of scale of manufacturing some packaged products at a specified plant and then transporting those products from the specified plant to a distribution center in which pooled safety stock of those products will be kept versus the cost of shipping those products from each plant to each distribution center.

Other Operating Costs

In some embodiments, the decision-making tool accounts for other operating costs. Examples of such other costs include the cost for tank maintenance (e.g., cost per hour tank time), cross shipment costs in a multi-plant application, cost for pumping (e.g., per hour), or the cost of bulk product held in tank (e.g., per liter). Another possible cost is the penalty for having a demand fulfillment rate that is lower than the target (i.e., the backlog cost).

Performance Metric

The performance metric in this example is the total cost that is the sum of the above cost terms.

Relevant Constraints

The relevant constraints include the availability of warehouse storage to receive pallets of packaged products and availability of workforce to operate the equipment. Where capacity is modeled as available time (e.g., hours) for production, the capacity constraints will ensure that the use of equipment does not exceed available hours for production on the equipment. Additional examples of model constraints include constraints relating to the following (which may be linear or non-linear terms in the model):

(1) the opening and closing of equipment;
(2) the equipment operating hours;
(3) the maximum overtime available for the equipment;
(4) warehouse capacity (e.g., for packaged products);
(5) amount of safety stock required;
(6) packaging lot sizes;
(7) impact of packaged product import on blended bulk product lot size;
(8) blending batch size limitations;
(9) blend number limitations;
(10) total amount of blended bulk product manufactured;
(11) storage tank assignments, which can depend upon whether or not blends are combined;
(12) load assignments to rack transport units;
(13) load volumes on storage tanks;
(14) load volumes on batch blending tanks;
(15) blend batch size constraints (which may be different depending upon whether blends are combined or not, i.e., there may be separate constraints for combined blending that are different from those for non-combined blending);
(16) packaging batch size constraints if blends are not combined;
(17) number of fills and total quantity of fills on the filling equipment;
(18) number of blends and total quantity of blended bulk products on blending equipment;

(19) limits on loading onto rack transport from in-line blending equipment;
(20) batch blend count requirements;
(21) filling equipment time requirements;
(22) blending equipment time requirements;
(23) rack transport time requirements;
(24) storage tank time requirements;
(25) batch blending tanks pump-in time requirements;
(26) number of blends in each tank by product;
(27) quality assurance (QA) time requirements;
(28) storage tank changeover times;
(29) storage tank pumping times;
(30) blend pumping and blend times;
(31) active time on tanks for each blended bulk product;
(32) total time on tanks for each blended bulk product, based on residence time and pumping time;
(33) total time limitations on tanks;
(34) availability of packaging equipment (e.g., limits on operating time for packaging equipment);
(35) availability of blending equipment (e.g., limits on operating time for blending equipment);
(36) availability of storage and/or batch blending tanks (e.g., limits on volume and/or occupancy times for tanks); or
(37) availability of labor workforce.

Demand and Target Demand Fulfillment Rate

In this embodiment, target demand fulfillment rate is input parameter that must be met. Demand data comprise historical demand for packaged products and historical demand for bulk product shipments. The decision making tool calculates demand probability distributions for each packaged product and determine a functional relationship between production batch size of each packaged product and level of safety stock for each packaged product necessary to meet the target demand fulfillment rate. Target demand fulfillment rate represents the probability of fulfilling demand, without having to replenish, during the replenishment lead time that is a function of production batch size of packaged products. In another embodiment, demand fulfillment rate can be derived as function of batch size. level of safety stock and historical demand probability distribution.

Solution Approaches

Because the constraints in the model include one or more non-linear terms (e.g., bilinear terms) involving the number of batches to produce and/or the size of each batch, the resulting model is a mixed-integer non-linear program (MINLP). As an approach to solving the MINLP, the decision-making tool may use any suitable relaxation and/or decomposition method known in the art. One such technique is to decompose the MINLP into a mixed-integer linear programming (MILP) subproblem and, optionally, a non-linear programming (NLP) subproblem. Where the MINLP is decomposed into both an MILP subproblem and an NLP subproblem, the resulting MILP and NLP subproblems can then be solved in a cooperative manner (e.g., iteratively).

The MILP subproblem may be formulated by a linear approximation of the MINLP. The resulting MILP subproblem may be solved by any suitable technique known in the art, including branch and bound techniques or cutting-plane techniques. For example, cuts may be added and the MILP subproblem solved iteratively until the violations of the original constraint(s) become less than a pre-determined tolerance level. In some embodiments, the decision-making tool may further refine the solution in a post-processing step that minimizes tank activity time. Alternatively, in some embodiments, tank activity may be minimized by including the cost of occupying the tanks as a function of the tank occupancy cost parameters. Alternatively in another embodiment, the MINLP may be solved by a genetic algorithm using a combinatorial approach to determine the optimal tank-product assignments, combine blending decisions, and/or the activation (or deployment) of production equipment and workforce.

Incorporation By Reference

All publications, patents and patent applications mentioned in this specification are herein incorporated by reference to the same extent as if each individual publication, patent or patent application was specifically and individually indicated to be incorporated by reference. No admission is made that any reference cited herein is prior art.

Invention is Broader than the Specific Embodiments

The present invention is not to be limited in scope by the specific embodiments described herein. Indeed, various modifications of the present invention, in addition to those described herein, will be apparent to those of ordinary skill in the art from the foregoing description and accompanying drawings. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

We claim:

1. A method for operating one or more bulk product blending and packaging plants in a manner that moves operations of a given plant, or a given collection of plants, toward an optimum for a performance metric during a designated time horizon comprising one or more time intervals under operating constraints and physical and/or economical limitations, each such plant comprising blending equipment, at least one storage tank, packaging equipment, one or more packaged product storage facilities and unloading and discharging facilities, wherein said method comprises the following steps:
 (I) a computer implemented step of receiving a data set comprising:
  (a) data identifying a time horizon comprising one or more time intervals;
  (b) data identifying blending equipment and one or more operational parameters thereof;
  (c) data identifying at least one storage tank and one or more operational parameters thereof;
  (d) data identifying packaging equipment and one or more operational parameters thereof;
  (e) data identifying packaged product storage facilities and one or more operational parameters thereof;
  (f) data identifying unloading and discharging facilities and one or more operational parameters thereof;
  (g) data relating to the interconnections between plant equipment; and
  (h) data relating to historical demand for each packaged product;
 (II) a computer implemented step of using the data set to populate model parameters of a mixed-integer non-linear mathematical optimization model constructed to mathematically describe the operations of the blending and packaging plant(s);
  wherein the model comprises model parameters, decision variables, constraints, and an objective function;

wherein the decision variables represent quantitative decisions to be made in each interval regarding plant capacity as a function of one or more of the following: number of production equipment, number of workers, production shift structure, overtime, number of product changeovers and setup time required to complete a product changeover;

wherein additional decision variables are quantitative decisions to be made in each interval regarding plant production and inventory;

wherein the constraints comprise:
(a) one or more terms limiting availability and capacity of the blending equipment;
(b) one or more terms limiting availability and capacity of the at least one storage tank;
(c) one or more terms limiting availability and capacity of the packaging equipment;
(d) one or more terms limiting availability and capacity of the packaged product storage facilities;
(e) one or more terms limiting availability and capacity of the unloading and discharging facilities;
(f) one or more non-linear terms relating number of batches of each packaged product to product batch size; and
(g) one or more non-linear terms relating the size of each batch of packaged products to quantity of safety stock required for the product;

wherein the objective function is a performance metric:
(III) a computer implemented step of running an algorithmic solver to obtain a solution to the mixed-integer non-linear mathematical optimization model; and
(IV) operating the plant(s) substantially according to the solution obtained or according to an operating plan made based on the solution obtained.

2. The method of claim 1, wherein the performance metric is selected from a group consisting of energy consumption, total or specific packaged product production, production time, demand fulfillment lead time, total or specific utilization of plant equipment, net profit, and demand fulfillment rate.

3. The method of claim 1, wherein the performance metric is total cost.

4. The method of claim 3, wherein the total cost is the sum of one or more of the following: (a) total operating cost, (b) total investment to add capacity, and (c) total divestment cost to reduce capacity.

5. The method of claim 4, wherein total operating cost includes the cost for operating the blending equipment, operating the packaging equipment, and holding inventory.

6. The method of claim 5, wherein data relating to the costs of operating the blending equipment and the packaging equipment include cost of overtime.

7. The method of claim 5, wherein data relating to the costs of operating the blending equipment and the packaging equipment include cost of slop generated.

8. The method of claim 5, wherein data relating to the cost of holding inventory is a function of inventory level.

9. The method of claim 5, wherein data set further comprises data relating to cost of maintaining plant equipment.

10. The method of claim 5, wherein the data set further comprises data relating to cost of operating a production shift structure and cost of changing from one production shift structure to another.

11. The method of claim 5, wherein the objective function of total operating cost also includes cost of maintaining plant equipment.

12. The method of claim 5, wherein the objective function of total operating cost also includes cost of adding and/or removing plant equipment.

13. The method of claim 1, wherein the data set is further defined as follows: (a) the data identifying the time horizon comprising one or more time intervals specifies a time period of plant operations to be optimized; (b) the data pertaining to the operational parameters of the blending equipment specifies one or more of blending equipment cleanup and preparation time, pump rate, requisite number of skilled workers necessary to operate the blending equipment, blender spindle speeds and blend rates; (c) the data pertaining to the operational parameters of the at least one storage tank specifies volume of the at least one storage tank, roof type, bottom type, heel volume and storage tank cleanup and preparation time; (d) the data pertaining to the operational parameters of the packaging equipment specifies one or more of packaging equipment cleanup and preparation time, packaging rate, requisite number of skilled workers necessary to operate the packaging equipment and volumetric bulk product package filling rate; (e) the data pertaining to the operational parameters of packaged product storage facilities specifies one or more of the availability and capacity of each packaged product warehouse, size of a batch unit of each packaged product and average warehouse residence time of each packaged product; (f) the data pertaining to the operational parameters of the unloading and discharging facilities specifies one or more of type of unloading and discharging equipment, unloading/discharging rates for each piece of equipment, unloading/discharging equipment cleanup and preparation time and average loading equipment residence time for each product; (g) the data relating to the interconnections between plant equipment comprises one or more of physical pipe connectivity linking the blending equipment to at least one storage tank and physical pipe connectivity linking each tank to one or more types of packaging equipment and/or unloading and discharging facilities; and (h) the data relating to historical demand for each packaged product specifies one or more of arrival time of customer demand events and, for each demand event, identity and quantity of products in the demand event.

14. The method of claim 1, wherein the data set further comprises data relating to compatibility of different bulk products and/or blended products with plant equipment.

15. The method of claim 1, wherein the data set further comprises data relating to production shift structures.

16. The method of claim 1, wherein the data set further comprises identity and quantity of blended bulk products and/or packaged bulk products that are available for purchase from third parties and/or affiliated plants.

17. The method of claim 1, wherein the data set further comprises data pertaining to costs associated with operating the plant(s).

18. The method of claim 1, wherein the data set further comprises data pertaining to financial value of each packaged product produced.

19. The method of claim 1, wherein the model includes a decision variable for one or more of the following: (i) requisite number of product batches and the size of the batches to be made for each packaged product; (ii) requisite number of product batches and size of each batch to be made for each blended product; (iii) whether and when to combine blending operations for like bulk products; (iv) requisite quantity of equipment including, but not limited to, blending equipment, packaging equipment and at least one storage tank; (v) whether and when to dedicate a storage tank to a blended product; (vi) requisite number and length of shifts per day;

(vii) requisite number of workers; (viii) requisite number of overtime hours; and (ix) requisite quantity of safety stock to be maintained for each packaged product and some blended products.

20. The method of claim 1, wherein the model includes a decision variable for each of the following: (i) requisite number of product batches and the size of the batches to be made for each packaged product; (ii) requisite number of product batches and size of each batch to be made for each blended product; (iii) whether and when to combine blending operations for like bulk products; (iv) requisite quantity of equipment including, but not limited to, blending equipment, packaging equipment and at least one storage tank; (v) whether and when to dedicate a storage tank to a blended product; (vi) requisite number and length of shifts per day; (vii) requisite number of workers; (viii) requisite number of overtime hours; and (ix) requisite quantity of safety stock to be maintained for each packaged product and some blended products.

21. The method of claim 1, wherein a decision variable is identity and quantity of any blended bulk products and/or packaged bulk products to be purchased from third parties and/or affiliated plants to augment production.

22. The method of claim 1, wherein constraints limiting the availability and capacity of the blending equipment specify one or more of the following: (i) limitations on the types and number of each type of blending equipment that can be utilized, (ii) limitations on production shift structures; (iii) limitations on availability of workers and their skills or ability to operate the blending equipment; and (iv) limitations on capability of blending equipment to process particular bulk products.

23. The method of claim 1, wherein constraints limiting the availability and capacity of the at least one storage tank specify one or more of the following: (i) restrictions on physical connectivity linking different pieces of plant equipment to the at least one storage tank; (ii) restrictions on time for setting up different storage tanks for receiving a batch of blended bulk product; (iii) restrictions on physical geometry and size of at least one storage tank; (iv) restrictions on time for pumping a batch of blended bulk product into a storage tank; (v) restrictions on time for conducting quality assurance testing on a blended bulk product; (vi) restrictions on time for setting up the filling equipment to manufacture a batch of packaged product; and (vii) restrictions on time for pumping blended bulk product out of different storage tanks.

24. The method of claim 1, wherein constraints limiting the availability and capacity of the packaging equipment specify one or more of the following: (i) limitations on types and number of each type of packaging equipment that can be utilized; (ii) limitations on the production shift structures; and (iii) limitations on availability of workers and their skills or ability to operate the packaging equipment.

25. The method of claim 1, wherein constraints limiting the availability and capacity of the packaged product storage facilities specify one or more of the following: (i) limitations on the size of a packaged product storage facility; (ii) limitations on residence time of a batch of each packaged product in a packaged product storage facility; and (iii) inventory turns of each packaged product.

26. The method of claim 1, wherein the constraints limiting the availability and capacity of the unloading and discharging facilities specify one or more of the following: (i) limitations on the rate packaged products that can be unloaded/discharged; (ii) limitations on the size of a batch of each packaged product; and (iii) limitations on residence time of a batch of each packaged product on unloading/discharging equipment.

27. The method of claim 1, wherein a constraint relating the number of batches of each packaged product to product batch size does so by making total manufactured quantity of a packaged product at least meet expected demand for the product.

28. The method of claim 1, wherein a constraint relating the size of each batch of packaged products to quantity of safety stock does so by making level of safety stock for each batch of packaged product having the specified batch size correspond to quantity that can fulfill customer demand over a length of time during which a replenishment order has been placed.

29. The method of claim 1 wherein the model comprises one or more constraints limiting identity and quantity of any blended bulk products and/or packaged bulk products that can be purchased from third parties and/or affiliated plants to augment production.

30. The method of claim 1 where the model assumes infinite availability of raw materials and identifies an optimal or near optimal solution to an optimization problem accordingly.

31. The method of claim 1 where availability of specified raw materials is a parameter to be populated from the data set and a constraint in the model is that utilization of specified raw materials cannot exceed availability.

32. The method of claim 1 where the availability of specified raw materials is a parameter to be populated from the data set and a constraint in the model is that available raw materials must fit in the at least one storage tank.

33. The method of claim 32 where the bulk product blending and packaging plant makes another decision to assign at least one storage tank to raw materials.

34. The method of claim 1 where amount of raw materials to acquire is another decision a bulk product blending and packaging plant makes in order to satisfy demand while optimizing a performance and a constraint in the model is that the acquired raw materials must fit in the at least one storage tank.

35. The method of claim 34 where the bulk product blending and packaging plant makes another decision to assign at least one storage tank to raw materials.

36. The method of claim 1, the demand data includes historical customer orders, from which a demand probability distribution for packaged products is calculated, and wherein a constraint for the model includes an order fulfillment rate for each packaged product that must be met.

37. The method of claim 1, the demand data includes historical customer orders, from which a demand probability distribution for packaged products is calculated, and wherein one decision variable of the model is order fulfillment rate.

38. The method of claim 1 wherein the method is used to optimize one bulk product blending and packaging plant in isolation.

39. The method of claim 1 wherein the method is used to simultaneously optimize a collection of bulk product blending and packaging plants to capture capacity, production and inventory cooperation benefits between plants;
wherein additional decision variables comprise decisions by a plant to purchase, rather than make, blended bulk products from another;
wherein additional decision variables comprise decisions by a plant to purchase, rather than make, packaged products from another;
wherein the data set is provided for each plant; and
wherein additional parameters and constraints exist to define the ability, benefits and/or detriments of transporting blended and/or packaged product between plants.

40. The method of claim 1 wherein the method is used to optimize a performance metric of a supply network comprising a collection of bulk product blending and packaging plants and a collection of distribution centers, both of which are located in a specified zone or geographic market;

wherein a distribution center is modeled by using a model of a bulk product blending and packaging plant having only facilities for storing packaged products, importing packaged products, and exporting packaged products;

wherein quantitative decisions to drive the performance metric toward optimum or near optimum value comprise:
  (i) plant capacity, production, and inventory decisions for each bulk product blending and packaging plant and
  (ii) distribution center capacity, inventory and product replenishment purchase decisions for each distribution center;

wherein additional quantitative decisions involve purchasing, rather than making, blended bulk product by a plant from another;

wherein additional quantitative decisions involve sourcing packaged products for each distribution center from each plant;

wherein additional quantitative decisions to purchase packaged products by a distribution center from another;

wherein a data set is provided for each plant and each distribution center;

wherein additional parameters and constraints exist to define ability, benefits and/or detriments of transporting blended product between plants;

wherein additional parameters and constraints exist to define ability, benefits and/or detriments of supplying a distribution center from a specific bulk product blending and packaging plant; and wherein additional parameters and constraints exist to define ability, benefits and/or detriments of transporting packaged product between distribution centers.

41. A decision making tool for identifying quantitative decisions said tool comprising the following components:
  (I) a first computer readable memory device storing a data file comprising:
    (a) data identifying a time horizon comprising one or more time interval;
    (b) data identifying plant blending equipment and one or more operational parameters thereof;
    (c) data identifying at least one plant storage tank and one or more operational parameters thereof;
    (d) data identifying plant packaging equipment and one or more operational parameters thereof;
    (e) data identifying packaged product storage facilities and one or more operational parameters thereof;
    (f) data identifying unloading and discharging facilities and one or more operational parameters thereof;
    (g) data relating to interconnections between plant equipment;
    (h) data relating to historical demand for each packaged product;
    (i) data identifying distribution centers and one or more operational parameters thereof;
    (j) data defining ability, benefits and/or detriments of transporting blended and/or packaged products between plants;
    (k) data defining ability, benefits, and/or detriments of transporting blended products between plants;
    (l) data defining ability, benefits, and/or detriments of transporting packaged products from each plant to each distribution center; and
    (m) data defining ability, benefits, and/or detriments of transporting packaged products between applicable distribution centers;
  (II) a second computer readable memory device, that may or may not be the first computer readable memory device, storing a mathematical model comprising parameters that describes operations of blending and packaging plant(s);
    wherein the model, in addition to parameters, comprises decision variables, constraints, and an objective function;
    wherein the decision variables represent quantitative decisions to be made in each interval regarding plant capacity as a function of one or more of the following: number of production equipment, number of workers, production shift structure, overtime, number of product changeovers and setup time required to complete a product changeover;
    wherein additional decision variables are quantitative decisions to be made in each interval regarding plant production and inventory;
    wherein the constraints comprise:
      (a) one or more terms limiting the availability and capacity of the blending equipment;
      (b) one or more terms limiting the availability and capacity of the at least one plant storage tank;
      (c) one or more terms limiting the availability and capacity of the packaging equipment;
      (d) one or more terms limiting the availability and capacity of the packaged product storage facilities;
      (e) one or more terms limiting the availability and capacity of the unloading and discharging facilities;
      (f) one or more non-linear terms relating number of batches of each packaged product to product batch size;
      (g) one or more non-linear terms relating size of each batch of packaged products to quantity of safety stock required for the product; and
      (i) one or more terms limiting the availability and capacity of the distribution centers; wherein the objective function is a performance metric; and
  (III) a processor comprising an optimization platform that comprises an algorithmic solver, wherein the optimization platform is operable to load the model, read the data file, populate the model parameters according to the data file, and execute the algorithmic solver, wherein the algorithmic solver is operable to manipulate decision variables in the model to identify a set of variable values that optimize the objective function.

42. A non-transitory machine readable storage medium, containing a computer program executable by a computer, wherein the computer program comprises code operable to cause a computer to identify quantitative decisions by causing the computer to perform the following actions:
  (I) reading a data file from a non-transitory machine readable storage medium comprising:
    (a) data identifying a time horizon comprising one or more intervals;
    (b) data identifying blending equipment and one or more operational parameters thereof;
    (c) data identifying storage tanks and one or more operational parameters thereof;
    (d) data identifying packaging equipment and one or more operational parameters thereof;

(e) data identifying packaged product storage facilities and one or more operational parameters thereof;
(f) data identifying unloading and discharging facilities and one or more operational parameters thereof;
(g) data relating to interconnections between plant equipment;
(h) data relating to historical demand for each packaged product;
(i) data identifying distribution centers and one or more operational parameters thereof;
(j) data defining ability, benefits and/or detriments of transporting blended and/or packaged products between plants;
(k) data defining ability, benefits, and/or detriments of transporting blended products between plants;
(l) data defining ability, benefits, and/or detriments of transporting packaged products from each plant to each distribution center; and
(m) data defining ability, benefits, and/or detriments of transporting packaged products between applicable distribution center;

(II) using the data file to populate model parameters in a mixed-integer non-linear mathematical optimization model, stored on a non-transitory machine readable storage medium, constructed to mathematically describe the operations of blending and packaging plant(s);

wherein the model, in addition to parameters, comprises decision variables, constraints, and an objective function;

wherein the decision variables represent quantitative decisions to be made in each interval regarding plant capacity as a function of one or more of the following: number of production equipment, number of workers, production shift structure, overtime, number of product changeovers and setup time required to complete a product changeover;

wherein additional decision variables are quantitative decisions to be made in each interval regarding plant production and inventory that are determined concurrently with those regarding plant capacity;

wherein the constraints comprise:
(a) one or more terms limiting the availability and capacity of the blending equipment;
(b) one or more terms limiting the availability and capacity of storage tanks;
(c) one or more terms limiting the availability and capacity of the packaging equipment;
(d) one or more terms limiting the availability and capacity of the packaged product storage facilities;
(e) one or more terms limiting the availability and capacity of the unloading and discharging facilities;
(f) one or more non-linear terms relating number of batches of each packaged product to product batch size; and
(g) one or more non-linear terms relating size of each batch of packaged products to quantity of safety stock required for the product; and wherein the objective function is a performance metric; and (III) executing an algorithmic solver to manipulate decision variables in the model to identify a solution set of variable values that optimize the objective function.

* * * * *